United States Patent
Yamamoto et al.

(10) Patent No.: US 12,556,056 B2
(45) Date of Patent: Feb. 17, 2026

(54) MOTOR AND PUMP DEVICE

(71) Applicant: NIDEC INSTRUMENTS CORPORATION, Nagano (JP)

(72) Inventors: Takashi Yamamoto, Nagano (JP); Kazuma Yamamoto, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 310 days.

(21) Appl. No.: 18/337,433

(22) Filed: Jun. 20, 2023

(65) Prior Publication Data

US 2024/0006950 A1    Jan. 4, 2024

(30) Foreign Application Priority Data

Jun. 30, 2022   (JP) .................................. 2022-105853

(51) Int. Cl.
*H02K 3/52* (2006.01)
*F04D 25/06* (2006.01)
*H02K 11/33* (2016.01)

(52) U.S. Cl.
CPC ............. *H02K 3/522* (2013.01); *F04D 25/06* (2013.01); *H02K 11/33* (2016.01); *H02K 2211/03* (2013.01)

(58) Field of Classification Search
CPC .... H02K 3/522; H02K 11/33; H02K 2211/03; H02K 3/50; H02K 5/225; F04D 25/06; F04D 25/0646; F04D 29/026
See application file for complete search history.

(56) References Cited

U.S. PATENT DOCUMENTS

| | | | |
|---|---|---|---|
| 2016/0285334 A1* | 9/2016 | Turnbull | H02K 3/50 |
| 2020/0088182 A1* | 3/2020 | Honda | F04C 29/068 |
| 2022/0278583 A1* | 9/2022 | Aoyagi | H02K 3/522 |

FOREIGN PATENT DOCUMENTS

| | | | |
|---|---|---|---|
| JP | 2013132143 A | * 7/2013 | |
| JP | 2019097371 A | * 6/2019 | |
| JP | 2021134769 | 9/2021 | |
| JP | 7194624 B2 | * 12/2022 | H02K 3/325 |

* cited by examiner

Primary Examiner — Jeremy A Luks
(74) Attorney, Agent, or Firm — JCIPRNET

(57) ABSTRACT

A motor includes a stator core having salient poles, an insulator held by the stator core, coils of a plurality of phases which are wound around the salient poles through the insulator, a board which is electrically connected with a plurality of wires for the number of the phases that are extended from the coils, and a conduction terminal which electrically connects the board with the stator core. The conduction terminal is provided with a main body part, a board connection part which is extended from the main body part and is electrically connected with the board, a core connection part which is extended from the main body part and is electrically connected with the stator core, and a held part which is held by the insulator. The core connection part is fixed to the stator core by welding.

16 Claims, 16 Drawing Sheets

MOTOR AND PUMP DEVICE

CROSS REFERENCE TO RELATED APPLICATION

The present invention claims priority under 35 U.S.C. § 119 to Japanese Application No. 2022-105853 filed Jun. 30, 2022, the entire content of which is incorporated herein by reference.

TECHNICAL FIELD

At least an embodiment of the present invention may relate to a motor including coils of a plurality of phases and a pump device.

BACKGROUND

A motor which includes a stator core covered by a case member, coils of a plurality of phases which are wound around the stator core, and a board which is electrically connected with wires extended from the respective coils is described in Japanese Patent Laid-Open No. 2021-134769 (Patent Literature 1). The motor described in Patent Literature 1 includes a conductive coupling plate which makes the stator core and the board in a conductive state. An upper end part of the conductive coupling plate is bent in a "V"-shape cross section and is structured so as to have a spring action. The upper end part of the conductive coupling plate is inserted into a space between the stator core and a case member which faces the stator core. When the upper end part of the conductive coupling plate is inserted into the space, the upper end part of the conductive coupling plate is contacted with the stator core with elasticity. A lower end part of the conductive coupling plate is fixed to the board by a fastening bolt in a sandwiched state between the board and the case member. In this manner, the stator core and the board are set in a conductive state.

In the technique described in Patent Literature 1, the upper end part of the conductive coupling plate is contacted with the stator core only by utilizing its elasticity and thus, contact of the upper end part of the conductive coupling plate with the stator core may become insufficient due to vibration of the motor and the like. Further, the upper end part of the conductive coupling plate and the stator core may be insufficiently contacted with each other depending on dimensions and shapes of the upper end part of the conductive coupling plate and the space. As a result, in the technique described in Patent Literature 1, there is a possibility that the stator core and the board are not set in a conductive state.

Thus, it is desired to provide a motor and a pump device which are capable of surely bringing a stator core and a conduction terminal into contact with each other when the stator core and a board are conducted with each other through the conduction terminal.

SUMMARY

According to at least an embodiment of the present invention, there may be provided a motor including a stator core in which a plurality of salient poles is disposed in a circumferential direction with a motor axial line as a center, an insulator which is held by the stator core, coils of a plurality of phases which are wound around the salient poles through the insulator, a board which is electrically connected with a plurality of wires for a number of the phases that are extended from the coils of the plurality of the phases and is disposed on one side in an axial line direction along the motor axial line with respect to the stator core, and a conduction terminal which electrically connects the board with the stator core. The conduction terminal includes a main body part whose plate thickness direction is directed in a radial direction, a board connection part which is extended from the main body part to one side in the axial line direction and is electrically connected with the board, a core connection part which is extended from the main body part to the other side in the axial line direction and is electrically connected with the stator core, and a held part which is held by the insulator, and the core connection part is fixed to the stator core by welding.

According to at least an embodiment of the present invention, the conduction terminal is fixed to the stator core by welding. According to this structure, the stator core and the conduction terminal are firmly fixed to each other by welding and thus, contact failure of the stator core with the conduction terminal due to vibration of the motor or the like can be restrained. As a result, the stator core and the board are surely set in a conductive state and thus, noise generated in the stator core can be surely restrained.

In the present invention, it is preferable that the core connection part is provided with an extended part which is extended in the axial line direction, and a bent part which is bent and extended in the radial direction from an end part on the other side of the extended part, and the bent part is abutted with the stator core and is fixed to the stator core by welding. According to this structure, the bent part is abutted with the stator core and thus, the conduction terminal can be fixed in a state positioned in the axial line direction.

In the present invention, it may be structured that the main body part is formed in a plate shape which is extended in the axial line direction, the held part is both end portions in a circumferential direction of the main body part, and the insulator is provided with a holding groove to which the held part is fitted in the axial line direction.

In the present invention, it is preferable that the holding groove is provided with a positioning rib which is protruded from an inner peripheral face of the holding groove. According to this structure, when the held part is fitted to the holding groove, the positioning rib is abutted with the held part to position the held part and thus, the conduction terminal is positioned by the insulator and held in a press-fitted state.

In the present invention, it is preferable that the bent part is bent and extended to an outer side in the radial direction from an end part on the other side of the extended part, and the insulator is provided with a cut-out part which is cut out in the axial line direction on an outer side in the radial direction of the holding groove. According to this structure, the core connection part can be accommodated in the cut-out part and thus, when the conduction terminal has been attached to the insulator, an increase in thickness in the radial direction of the insulator and the conduction terminal can be restrained. Further, the bent part and the stator core can be welded to each other from an outer side in the radial direction and thus, a welding operation is easily performed.

In the present invention, it may be structured that the held part is provided with a first leg part which is located on one side in a circumferential direction with respect to the core connection part and is protruded from the main body part to the other side in the axial line direction, and a second leg part which is located on the other side in the circumferential direction with respect to the core connection part and is protruded from the main body part to the other side in the axial line direction, and the insulator is provided with a first hole into which the first leg part is fitted and a second hole into which the second leg part is fitted. In this case, it is preferable that one of the first hole and the second hole is a press-fitted hole, and the other of the first hole and the second hole is a guide hole. According to this structure, the other of the first hole and the second hole is a guide hole and thus, the conduction terminal is easily attached to the insulator in comparison with a case that both of the two leg parts are press-fitted.

In the present invention, it may be structured that each of the first leg part and the second leg part is formed in a bar shape with a quadrangular cross section, the press-fitted hole is formed in a shape with a circular cross section, and the guide hole is formed in a shape with a quadrangular cross section.

In the present invention, it is preferable that the guide hole is provided with a positioning rib which is protruded from an inner peripheral face of the guide hole in the radial direction. According to this structure, when the other leg part is fitted to the guide hole, the positioning rib is abutted with the other leg part to position the other leg part in the radial direction.

In the present invention, it is preferable that the bent p art is bent and extended to an outer side in the radial direction from an end part on the other side of the extended part, and the insulator is provided with a cut-out part which is cut out in the axial line direction between the first hole and the second hole. According to this structure, the core connection part can be accommodated in the cut-out part and thus, when the conduction terminal has been attached to the insulator, an increase in thickness in the radial direction of the insulator and the conduction terminal can be restrained. Further, the bent part and the stator core can be welded to each other from an outer side in the radial direction and thus, a welding operation is easily performed.

In the present invention, it is preferable that the conduction terminal is provided with a wire connection part which is bent so as to hold end parts of a plurality of the wires on an inner side. According to this structure, a terminal used for controlling the motor can be made as the conduction terminal.

In the present invention, it may be structured that the wire connection part is provided with a first wire connection part to which an end part of a part of the plurality of the wires is reached from one side in the circumferential direction, and a second wire connection part to which an end part of a remaining part of the plurality of the wires is reached from the other side in the circumferential direction, and the first wire connection part is located on one side in the circumferential direction with respect to the first leg part, and the second wire connection part is located on the other side in the circumferential direction with respect to the second leg part.

In the present invention, it may be structured that the insulator includes a plurality of divided insulators each of which is provided so as to correspond to each of a plurality of the salient poles, and the conduction terminal is held by a first divided insulator which is one of the plurality of the divided insulators. According to this structure, the conduction terminal is provided in one of the divided insulators and thus, relative positional accuracy of the hole into which the leg part is fitted is high. Therefore, attachment of the conduction terminal to the insulator is easy.

In the present invention, it is preferable that a second divided insulator of the plurality of the divided insulators which is located on one side in the circumferential direction with respect to the first divided insulator is provided with a groove part for guiding the part of the plurality of the wires, the groove part is provided with a first wall part located on an inner side in the radial direction, a second wall part located on an outer side in the radial direction with respect to the first wall part, and a bottom part which connects the first wall part with the second wall part, the bottom part is inclined to one side in the axial line direction toward the other side in the circumferential direction and, when viewed in a direction perpendicular to the axial line direction, an end part on the other side in the circumferential direction of the bottom part is overlapped with a part of the first wire connection part. According to this structure, when the part of the plurality of the wires is guided from the groove part to the first wire connection part, the part of the plurality of the wires is located at a substantially equal height position to the first wire connection part and thus, an end part of the part of the plurality of the wires is easily connected with the first wire connection part.

In the present invention, it is preferable that the press-fitted hole is penetrated through in the axial line direction, the stator core is provided with a third hole which is overlapped with the press-fitted hole in the axial line direction, and one of the first leg part and the second leg part which is fitted to the press-fitted hole is press-fitted to the third hole. According to this structure, one of the first leg part and the second leg part of the conduction terminal is press-fitted to the third hole of the stator core and thus, the conduction terminal is hard to come out from the insulator.

The motor in accordance with the present invention may be used in a pump device and, in this case, the pump device includes an impeller which is rotationally driven by the above-mentioned motor.

In the present invention, the conduction terminal is fixed to the stator core by welding. Therefore, contact failure of the stator core with the conduction terminal due to vibration of the motor or the like can be restrained. As a result, the stator core and the board are surely set in a conductive state and thus, noise generated in the stator core can be further surely restrained.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Motors and pump devices in accordance with embodiments of the present invention will be described below with reference to the accompanying drawings. In the following descriptions, a motor axial line "L" direction is an axial line direction along a motor axial line "L", a radial direction indicating an inner side in the radial direction and an outer side in the radial direction is a radial direction with the motor axial line "L" as a center, and a circumferential direction is a rotation direction with the motor axial line "L" as a center.

(Entire Structure)

Figure 1:
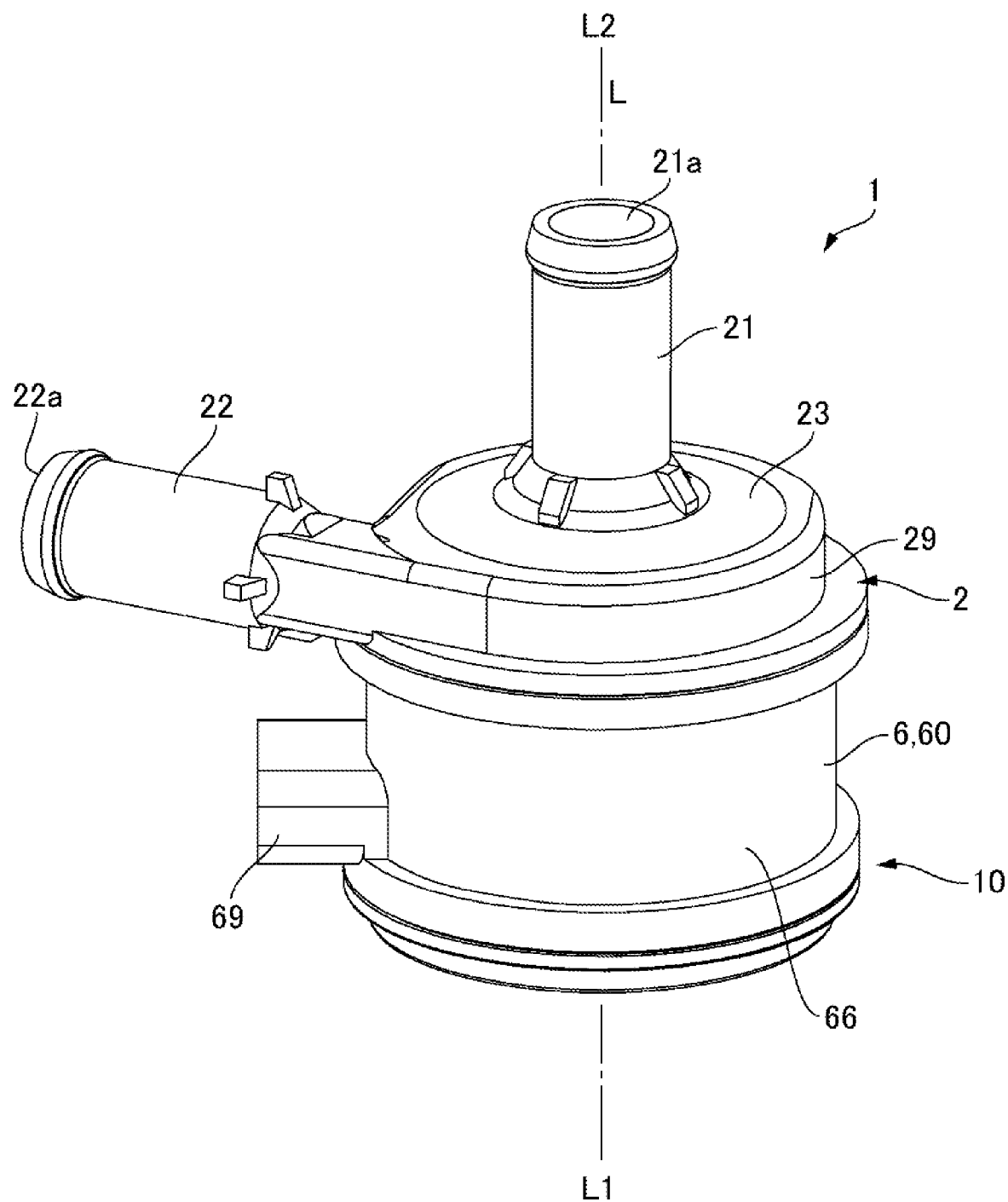
FIG. 1 is a perspective view showing a pump device and a motor in accordance with an embodiment of the present invention.
Figure 2:
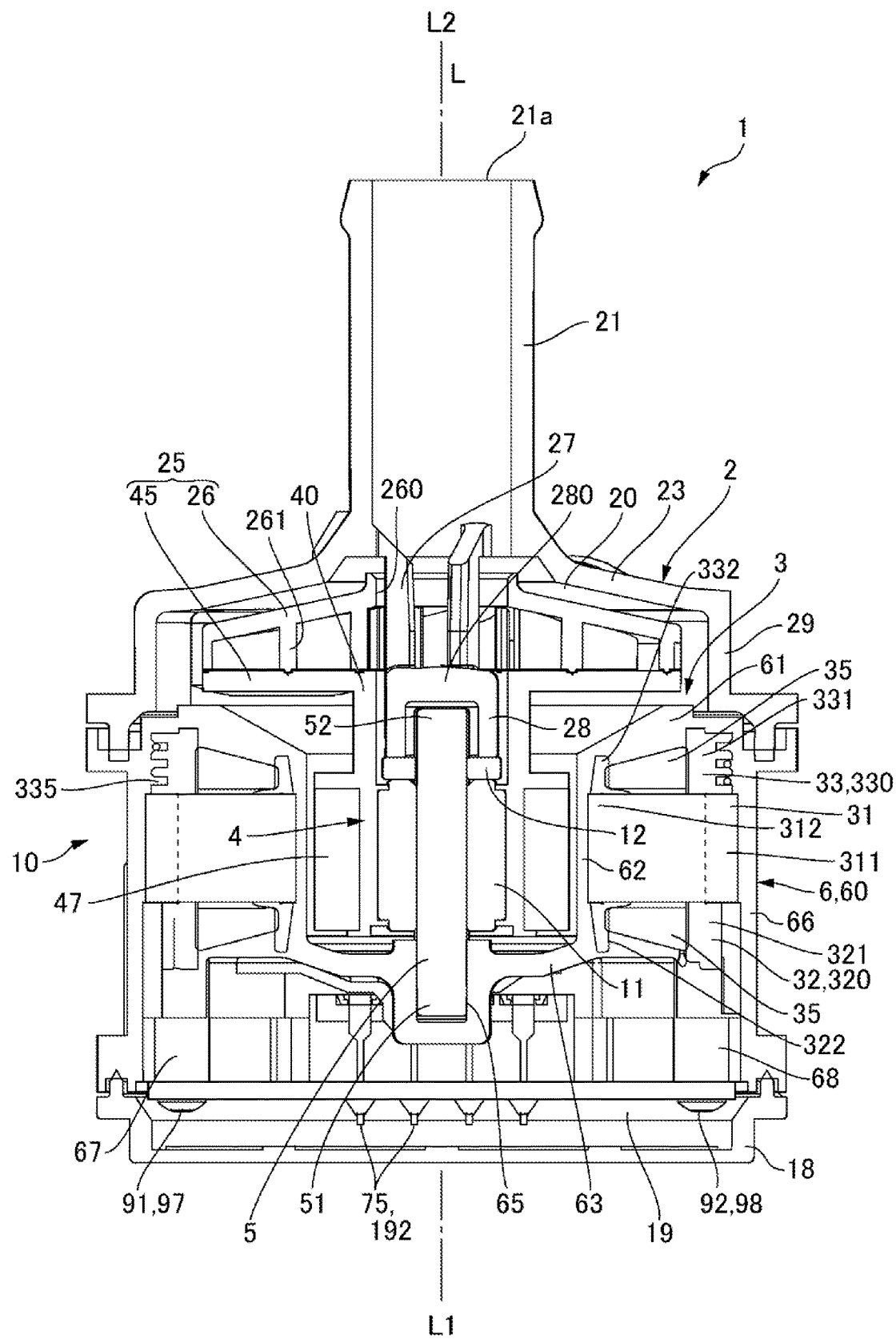
FIG. 2 is a longitudinal cross-sectional view showing the pump device and the motor shown in FIG. 1.

FIG. 1 is a perspective view showing a pump device 1 and a motor 10 in accordance with an embodiment of the present invention. FIG. 2 is a cross-sectional view showing the pump device 1 and the motor 10 in FIG. 1. In FIGS. 1 and 2, the pump device 1 includes a case 2, the motor 10 which is disposed on one side "L1" in the motor axial line "L" direction with respect to the case 2, and an impeller 25 which is disposed in a pump chamber 20 provided on an inner side of the case 2. The impeller 25 is rotationally driven by the motor 10 around the motor axial line "L". The motor 10 includes a stator 3 in a cylindrical tube shape, a rotor 4 disposed on an inner side with respect to the stator 3, a housing 6 made of resin which covers the stator 3, and a support shaft 5 in a round bar shape which rotatably supports the rotor 4. The support shaft 5 is made of metal or ceramic. In the pump device 1 in this embodiment, fluid is liquid and the pump device 1 is used as an on-vehicle pump in which the environment temperature and the fluid temperature are easily changed.

The case 2 structures a side wall 23 on the other side "L2" in the motor axial line "L" direction of the pump device 1 and a side wall 29 which is extended in the circumferential direction. The case 2 is provided with a suction pipe 21 which is extended along the motor axial line "L", and a discharge pipe 22 which is extended in a direction perpendicular to the motor axial line "L". The suction pipe 21 is provided with a suction port 21a. The discharge pipe 22 is provided with a discharge port 22a. The suction pipe 21 is provided so as to be concentric with the motor axial line "L".

The stator 3 includes a stator core 31, insulators 32 and 33 held by the stator core 31, and a coil 35 which is wound around the stator core 31 through the insulators 32 and 33.

The rotor 4 includes a cylindrical tube part 40 which is extended in the axial line "L" direction from a position facing the stator 3 on an inner side in the radial direction to the pump chamber 20. The cylindrical tube part 40 is opened to the pump chamber 20. A magnet 47 in a cylindrical tube shape is held on an outer peripheral face of the cylindrical tube part 40 so as to face the stator 3 on an inner side in the radial direction. The magnet 47 is, for example, a neodymium bond magnet.

An end part on the other side "L2" in the motor axial line "L" direction of the cylindrical tube part 40 is formed with a flange part 45 in a circular plate shape. The flange part 45 is connected with a circular plate 26 from the other side "L2" in the motor axial line "L" direction. A center of the circular plate 26 is formed with a center hole 260. A face of the circular plate 26 facing the flange part 45 is formed with a plurality of blade parts 261 which are extended at equal angular intervals from a periphery of the center hole 260 to an outer side in the radial direction while curving in a circular arc shape. The circular plate 26 is fixed to the flange part 45 through the blade parts 261. Therefore, the impeller 25 connected with the cylindrical tube part 40 of the rotor 4 is structured by the flange part 45 and the circular plate 26. In this embodiment, the circular plate 26 is structured so that its outer side in the radial direction is inclined to a side of the flange part 45 from its inner side in the radial direction.

A radial bearing 11 in a cylindrical tube shape is held on an inner side in the radial direction of the cylindrical tube part 40. The rotor 4 is rotatably supported by the support shaft 5 through the radial bearing 11. A first end part 51 on one side "L1" in the motor axial line "L" direction of the support shaft 5 is held by a shaft hole 65 which is formed in a bottom wall 63 of the housing 6. The case 2 is formed with a receiving part 280 which faces a second end part 52 of the support shaft 5 on the pump chamber 20 side to restrict a movable range of the support shaft 5 to the pump chamber 20 side. The case 2 is provided with a support part 27 which is extended from an inner peripheral face of the suction pipe 21 to the motor 10 side. An end part of the support part 27 is formed with a tube part 28 in which the support shaft 5 is located on its inner side. The receiving part 280 is structured of a bottom part on the other side "L2" in the motor axial line "L" direction of the tube part 28. The second end part 52 of the support shaft 5 is attached with a thrust bearing 12 in a circular ring shape. The thrust bearing 12 is arranged between the radial bearing 11 and the tube part 28. In this embodiment, at least a part of each of the first end part 51 and the shaft hole 65 is formed with a "D"-shaped cross section, and each of the second end part 52 of the support shaft 5 and a hole of the thrust bearing 12 is formed with a "D"-shaped cross section. As a result, rotation of the support shaft 5 and the thrust bearing 12 is prevented.

The housing 6 is provided with a first partition part 61 which faces the side wall 23 of the pump chamber 20, a second partition part 62 which is located between the stator 3 and the magnet 47, and a body part 66 in a cylindrical tube shape which covers the stator 3 from an outer side in the radial direction. Therefore, the housing 6 is a resin sealing member 60 which covers the stator 3 from both sides in the radial direction and from both sides in the motor axial line "L" direction. The resin sealing member 60 is a resin portion which is formed by insert-molding the stator 3 with polyphenylene sulfide (PPS) or the like.

(Detailed Structure of Motor 10)

Figure 3:
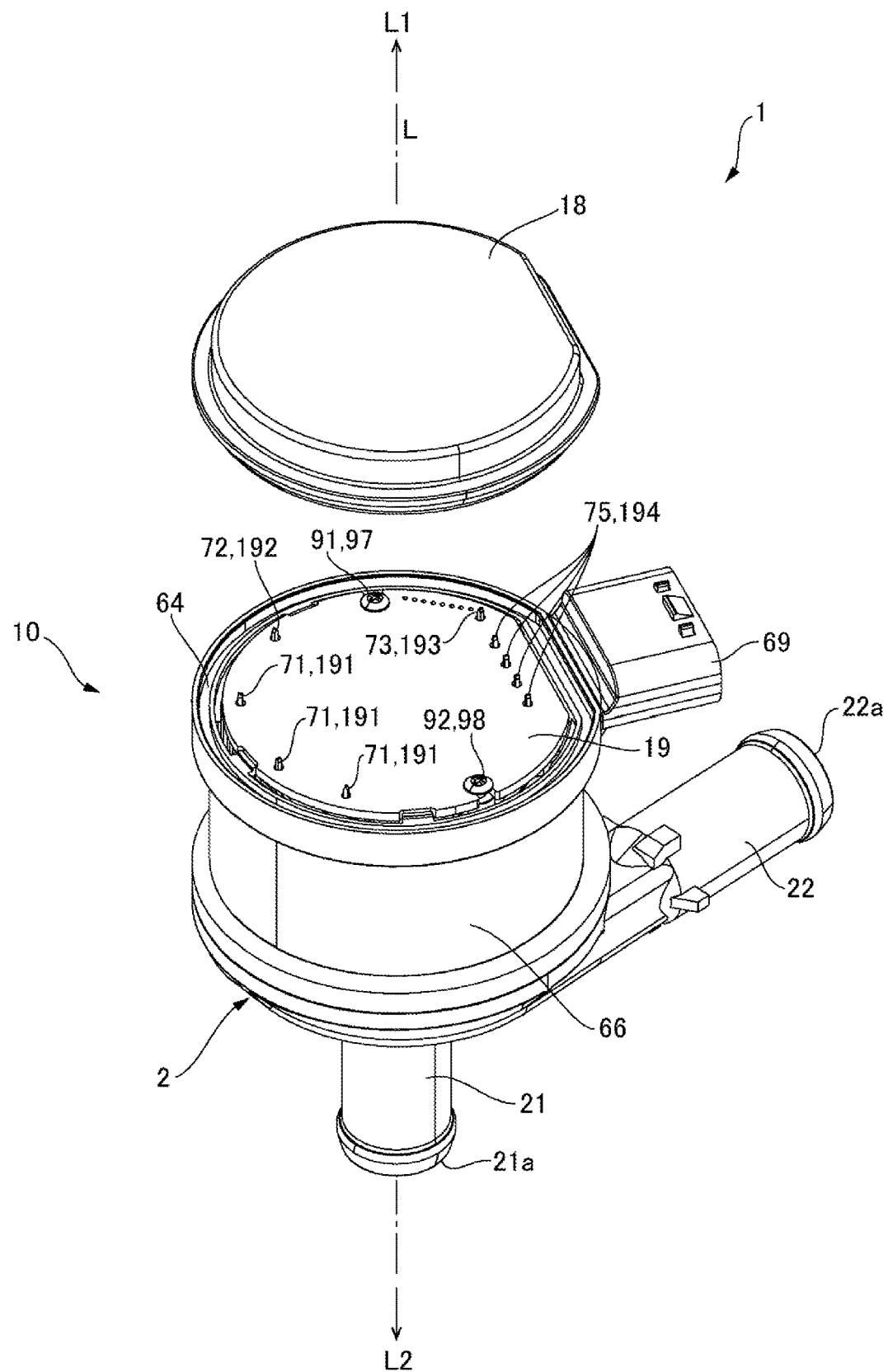
FIG. 3 is an exploded perspective view showing a state that a cover is detached from the pump device shown in FIG. 1.
Figure 4:
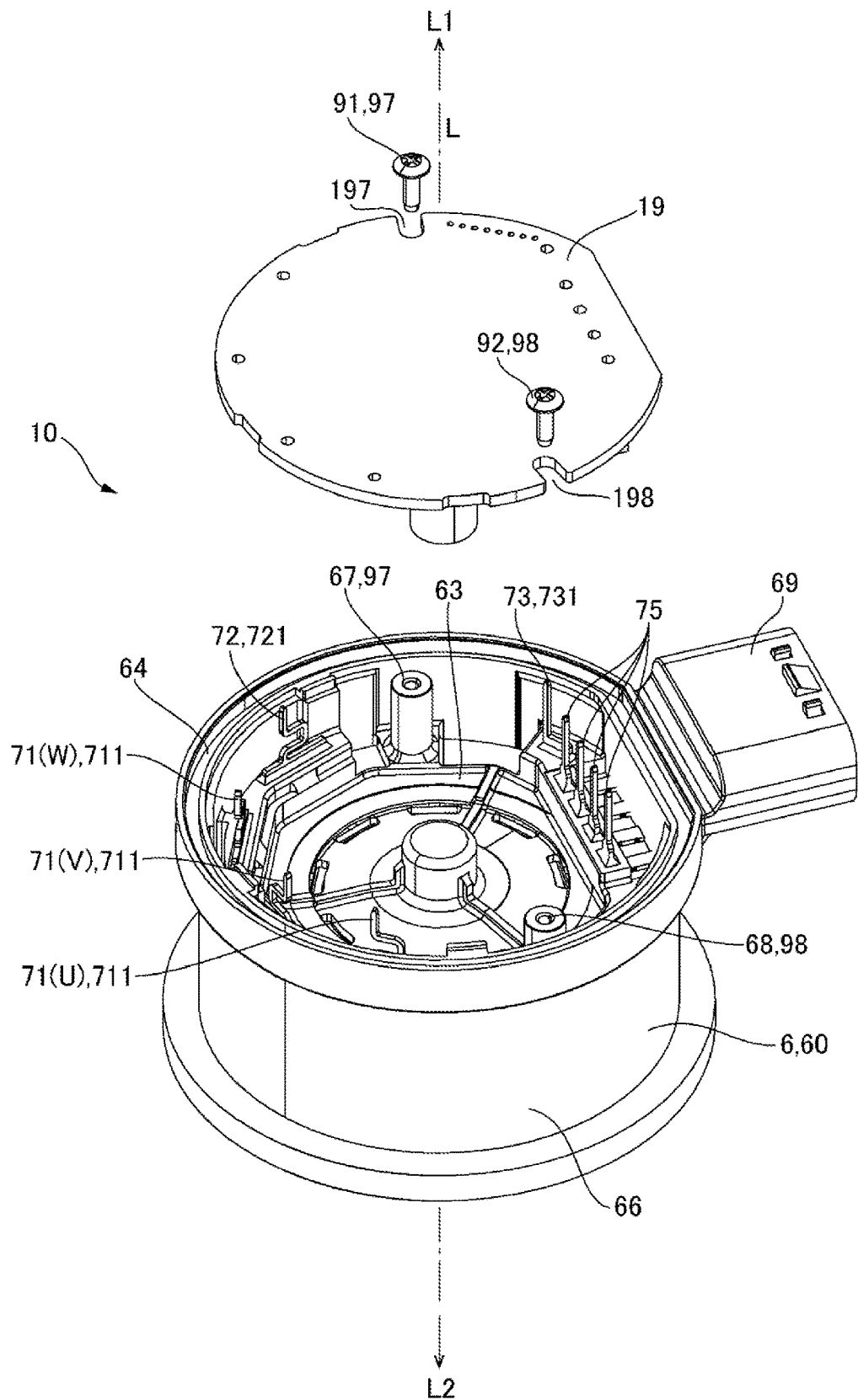
FIG. 4 is an exploded perspective view showing a state that a board is detached in the state shown in FIG. 3.
Figure 5:
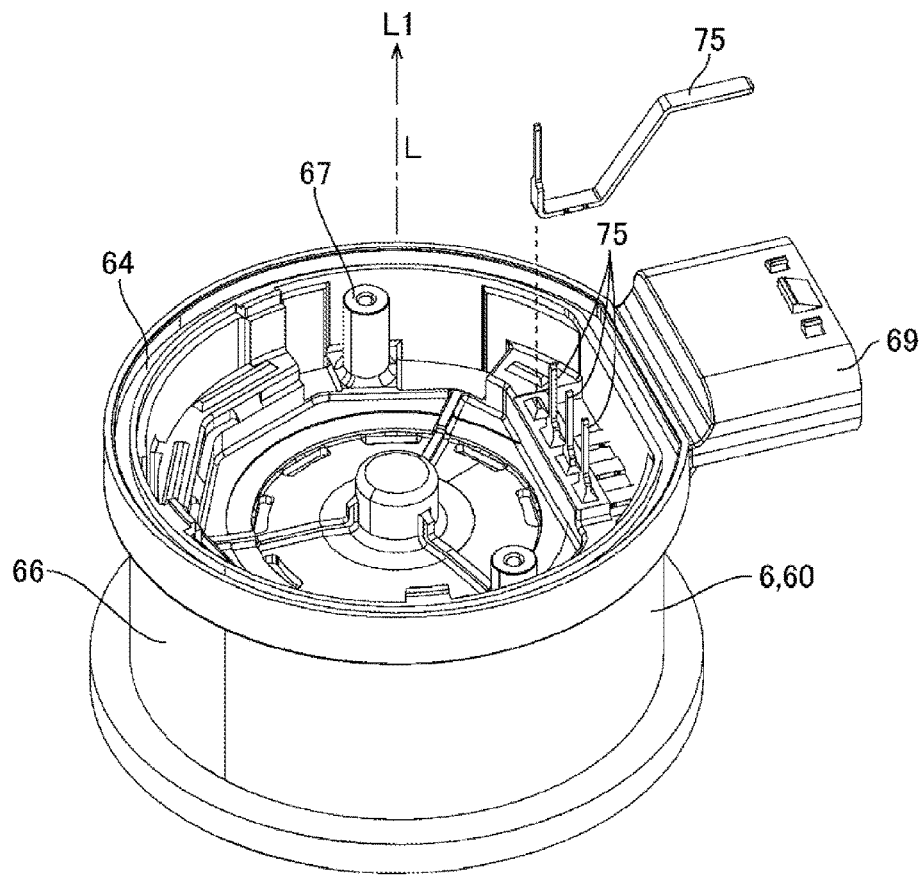
FIG. 5 is an exploded perspective view showing a state that a housing and a stator are separated from each other in the motor shown in FIG. 1.
Figure 5:
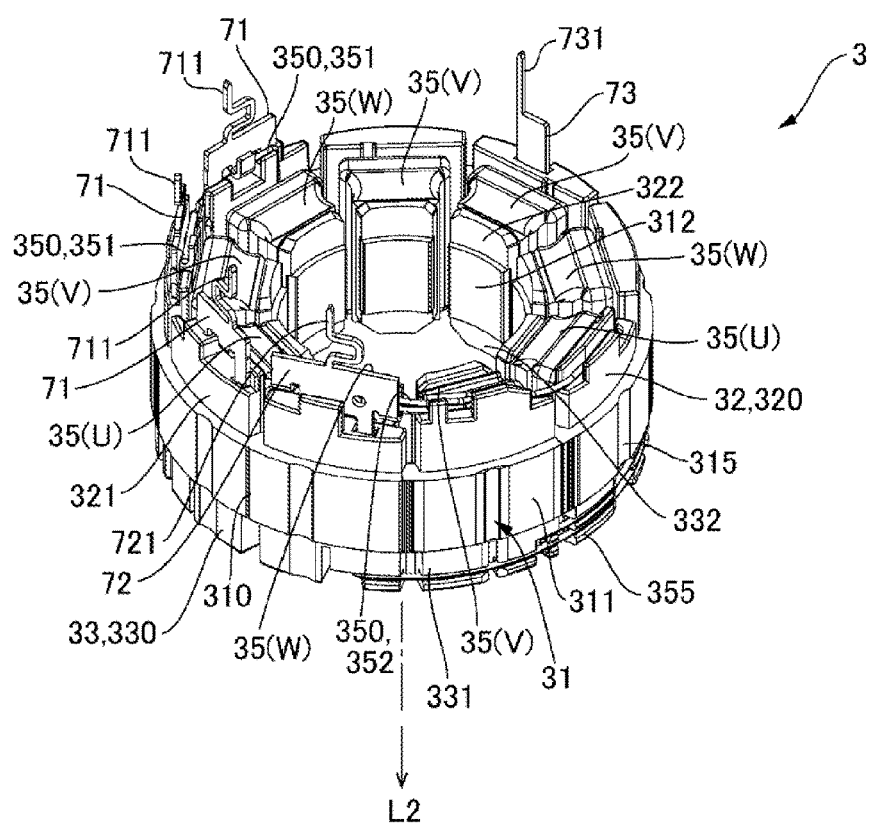

FIG. 3 is an exploded perspective view showing a state that a cover 18 is detached from the pump device 1 shown in FIG. 1. FIG. 4 is an exploded perspective view showing a state that a board 19 is detached in the state shown in FIG. 3. FIG. 5 is an exploded perspective view showing a state that the housing 6 and the stator 3 are separated from each other in the motor 10 shown in FIG. 1.

As shown in FIGS. 2, 3 and 4, an end part 64 on one side "L1" in the motor axial line "L" direction of the housing 6 is fixed with a cover 18 from one side "L1" in the motor axial line "L". A board 19 on which a circuit for controlling power feeding to the coil 35 and the like are mounted is disposed between the cover 18 and the bottom wall 63 of the housing 6.

The board 19 is fixed to the housing 6 by a first fixing part 97 which uses a first screw 91 and a second fixing part 98 which uses a second screw 92. The housing 6 is formed with a first column part 67 which is protruded toward one side "L1" in the motor axial line "L" direction from the bottom wall 63. The first screw 91 is screwed to the first column part 67 through a cut-out part 197 formed at an edge of the board 19 and thereby, the first fixing part 97 is structured. Further, the housing 6 is formed with a second column part 68 which is protruded toward one side "L1" in the motor axial line "L" direction from the bottom wall 63. The second screw 92 is screwed to the second column part 68 through a cut-out part 198 formed at an edge of the board 19 and thereby, the second fixing part 98 is structured.

The board 19 is provided with a plurality of first connection parts 191, a second connection part 192, a third connection part 193 and a plurality of fourth connection parts 194. A plurality of the first connection parts 191 is connected with metal winding terminals 71 by soldering which are penetrated through the bottom wall 63 of the housing 6 and protruded to one side "L1" in the motor axial line "L" direction from the stator 3. The second connection part 192 is connected with a metal common terminal 72 by soldering which is penetrated through the bottom wall 63 of the housing 6 and protruded to one side "L1" in the motor axial line "L" direction from the stator 3. The third connection part 193 is connected with a metal conduction terminal 73 by soldering which is penetrated through the bottom wall 63 of the housing 6 and protruded to one side "L1" in the motor axial line "L" direction from the stator 3. The fourth connection parts 194 are connected with metal connector terminals 75 which are held in the housing 6 by soldering. The board 19 is formed with wirings and the like which electrically connect the first connection parts 191, the second connection part 192, the third connection part 193 and a plurality of the fourth connection parts 194 through a drive circuit and the like mounted on the board 19.

The housing 6 is formed with a connector housing 69 in a tube shape. End parts of the connector terminals 75 are located on an inner side of the connector housing 69. Therefore, when a connector is connected to the connector housing 69 and a signal and the like are supplied, the signal is inputted to the drive circuit through the connector terminals 75 and the fourth connection parts 194. As a result, drive currents generated in the drive circuit are supplied to the respective coils 35 through the first connection parts 191 and the winding terminals 71 and thereby, the rotor 4 is rotated around the motor axial line "L". Accordingly, the impeller 25 is rotated in an inside of the pump chamber 20 and the inside of the pump chamber 20 becomes negative pressure and thus, fluid is sucked into the pump chamber 20 through the suction pipe 21 and is discharged through the discharge pipe 22.

As shown in FIGS. 2 and 5, the stator core 31 is provided with a circular ring-shaped part 311 which is extended in a circular ring shape, and a plurality of salient poles 312 which are protruded to an inner side in the radial direction from the circular ring-shaped part 311. The salient poles 312 are disposed at a constant pitch in the circumferential direction. The stator core 31 is a laminated core which is formed by laminating thin magnetic plates made of magnetic material. An outer peripheral face of the circular ring-shaped part 311 is formed with recessed parts 315 extended in the motor axial line "L" direction at positions corresponding to a plurality of the salient poles 312. In this embodiment, the stator core 31 is structured so that a member extended in a straight line shape is bent in a circular ring shape and then, end parts of the circular ring-shaped part 311 are welded to each other. Therefore, the stator core 31 is provided with a welded part 310 which connects the end parts of the member extended in the circumferential direction at one position in the circumferential direction of the circular ring-shaped part 311.

The insulators 32 and 33 are respectively overlapped with the stator core 31 from both sides in the motor axial line "L" direction and respectively cover a plurality of the salient poles 312. In this embodiment, the insulators 32 and 33 are respectively comprised of a plurality of divided insulators 320 and 330 which are divided so as to correspond to a plurality of the salient poles 312. A plurality of the divided insulators 320 and 330 is provided with outer peripheral side portions 321 and 331 which are overlapped with the circular ring-shaped part 311 of the stator core 31 in the motor axial line "L" direction, inner peripheral side portions 322 and 332 which are protruded in the motor axial line "L" direction at end parts of the salient pole 312 on an inner side in the radial direction, and tube part forming portions (not shown) which connect the outer peripheral side portions 321 and 331 with the inner peripheral side portions 322 and 332. The coil 35 is wound around the salient pole 312 through the tube part forming portions.

The motor 10 is a three-phase motor. Therefore, a plurality of the coils 35 is structured of a first phase coil 35(U) comprised of a "U"-phase coil, a second phase coil 35(V) comprised of a "V"-phase coil, and a third phase coil 35(W) comprised of a "W"-phase coil, which are arranged in this order. In this embodiment, the first phase coil 35(U), the second phase coil 35(V) and the third phase coil 35(W) are respectively disposed at three positions and thus, the total number of the coils 35 is 9 (nine). Therefore, the total number of each of the divided insulators 320 and 330 is 9 (nine).

In this embodiment, the first phase coil 35(U) is structured of one wire 350. Therefore, the three first phase coils 35(U) are electrically connected with each other in series. The second phase coil 35(V) and the third phase coil 35(W) are similarly structured.

Further, in the nine divided insulators 320, the outer peripheral side portion 321 of each of the divided insulator 320 corresponding to one of the first phase coils 35(U), the divided insulator 320 corresponding to one of the second phase coils 35(V) and the divided insulator 320 corresponding to one of the third phase coils 35(W) holds the winding terminal 71. Each of three winding terminals 71 is connected with one end part 351 of the wire 350 which structures three serially-connected coils 35, and the other end part 352 is electrically connected with the common terminal 72 made of metal. In this embodiment, the other end part 352 is an end part of a winding start and one end part 351 is an end part of a winding end.

The winding terminal 71 is protruded from the divided insulator 320 toward one side "L1" in the motor axial line "L" direction. A board connection part 711 which is a tip end part of the winding terminal 71 is connected with the first connection part 191 of the board 19 shown in FIGS. 2, 3 and 4. Further, as shown in FIG. 4, the board connection part 711 is protruded and exposed from the bottom wall 63 of the resin sealing member 60 to one side "L1" in the motor axial line "L" direction.

(Structure of Common Terminal 72)

Figure 6:
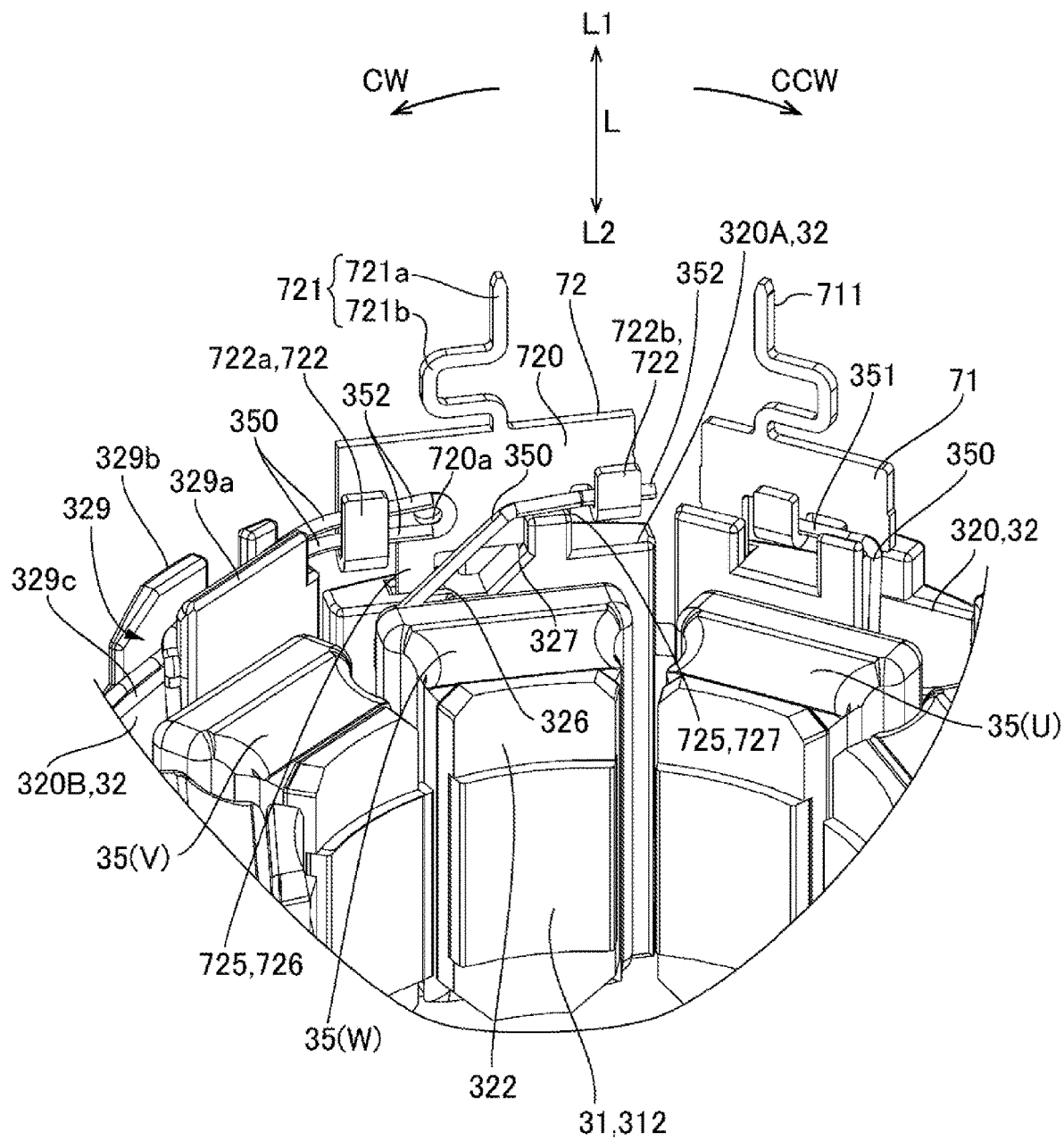
FIG. 6 is a perspective view showing a common terminal and its surroundings shown in FIG. 5 which are viewed from an inner side in a radial direction.
Figure 7:
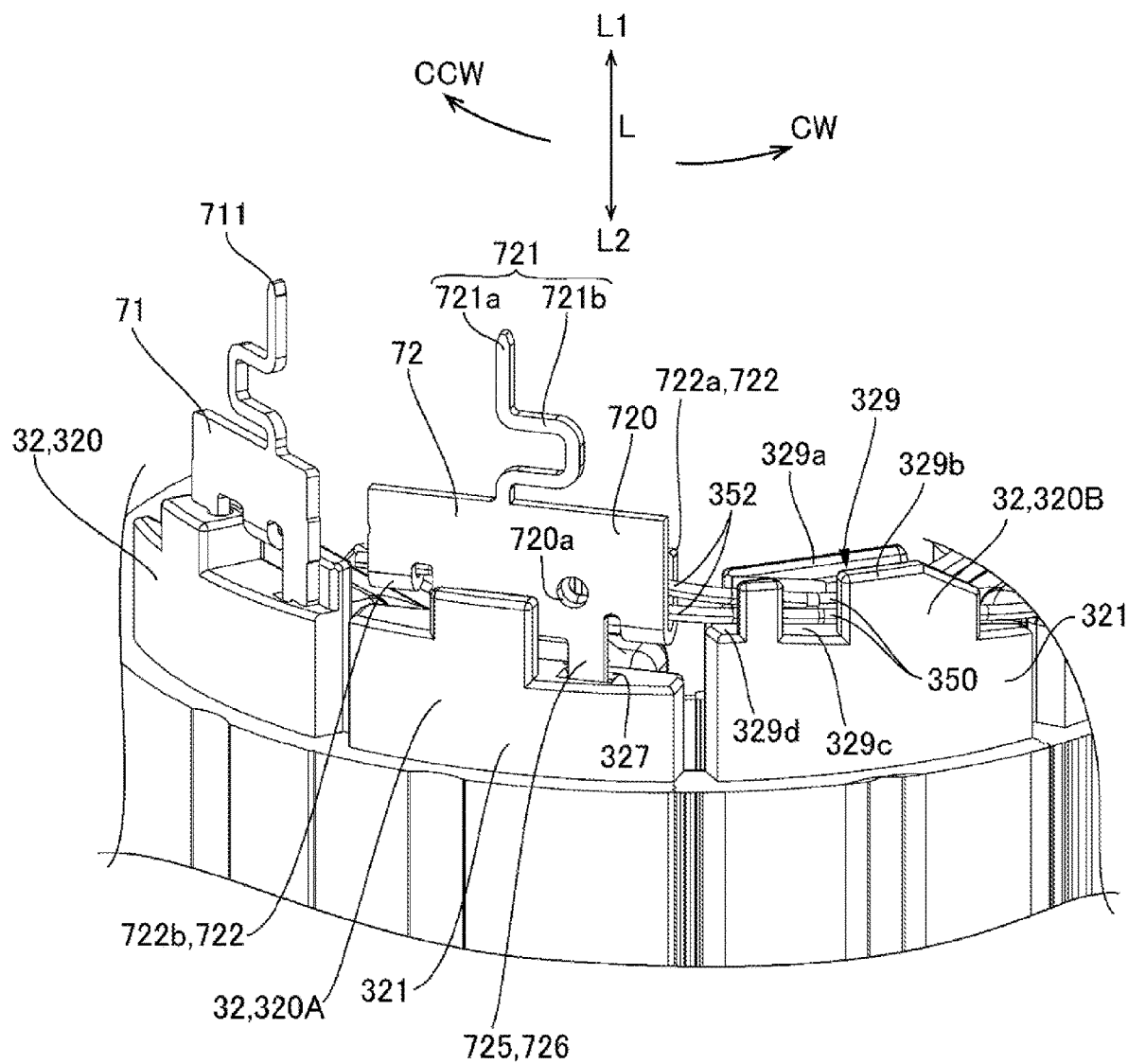
FIG. 7 is a perspective view showing a common terminal and its surroundings shown in FIG. 5 which are viewed from an outer side in the radial direction.
Figure 8:
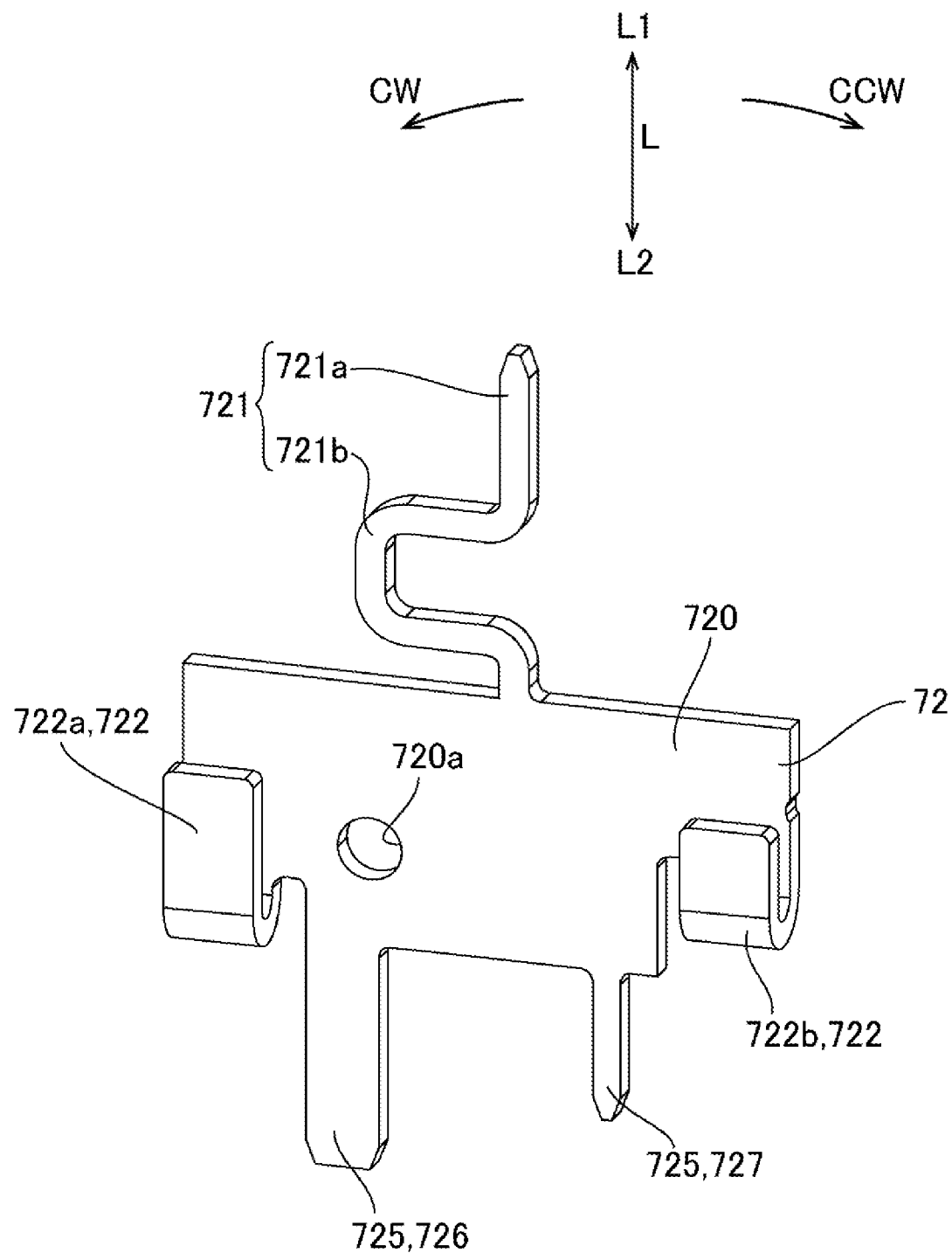
FIG. 8 is a perspective view showing the common terminal in FIG. 5.

FIG. 6 is a perspective view showing the common terminal 72 and its surroundings shown in FIG. 5 which are viewed from an inner side in the radial direction. FIG. 7 is a perspective view showing the common terminal 72 and its surroundings shown in FIG. 5 which are viewed from an outer side in the radial direction. FIG. 8 is a perspective view showing the common terminal 72.

As shown in FIGS. 6 and 7, the outer peripheral side portion 321 of a first divided insulator 320A among the divided insulators 320 where the winding terminal 71 is not provided holds the common terminal 72 with which the end parts 352 of the winding starts of the wires 350 for the number of the phases which are respectively extended from the coils 35 of a plurality of phases are connected.

As shown in FIGS. 6, 7 and 8, the common terminal 72 is provided with a main body part 720 whose plate thickness direction is directed in the radial direction and which is extended in the circumferential direction, the board connection part 721 which is protruded from the main body part 720 to one side "L1" in the motor axial line "L" direction, two wire connection parts 722 which are portions protruded from two positions in the circumferential direction of the main body part 720 and are bent so as to hold the end parts 352 of the wires 350 on their inner sides, and leg parts 725 which are protruded from the main body part 720 toward the first divided insulator 320A.

The board connection part 721 is electrically connected with the second connection part 192 and is electrically connected with a ground of the board 19 through the second connection part 192. In this embodiment, the board connection part 721 is provided with a straight portion 721a which is electrically connected with the second connection part 192, and an elastic portion 721b which is elastically deformable between the straight portion 721a and the main body part 720. The straight portion 721a is extended in a straight line shape in the motor axial line "L" direction. The elastic portion 721b is curved to one side "CW" in the circumferential direction. In this embodiment, as shown in FIG. 4, the board connection part 721 is protruded and exposed from the bottom wall 63 of the resin sealing member 60 to one side "L1" in the motor axial line "L" direction.

The main body part 720 is formed in a flat plate shape which is extended in a straight line manner along the circumferential direction. The leg parts 725 are held by the first divided insulator 320A. The leg parts 725 are provided between the wire connection parts 722.

Further, each of two wire connection parts 722 is bent so as to hold the end part 352 of the wire 350 on its inner side. The wire connection part 722 holds the end part 352 of the wire 350 by fusing processing and is electrically connected with the end part 352 of the wire 350. In the fusing processing, thermal caulking work is performed in which the wire 350 and the wire connection part 722 are connected with each other by utilizing electric resistance.

As shown in FIGS. 6, 7 and 8, the two wire connection parts 722 includes a first wire connection part 722a and a second wire connection part 722b which is provided on the other side "CCW" in the circumferential direction with respect to the first wire connection part 722a. The end part 352 of the wire 350 extended from the first phase coil 35(U) and the end part 352 of the wire 350 extended from the second phase coil 35(V) are reached from one side "CW" in the circumferential direction and connected with the first wire connection part 722a. The end part 352 of the wire 350 extended from the third phase coil 35(W) is reached from one side "CW" in the circumferential direction and connected with the second wire connection part 722b. In this embodiment, the main body part 720 of the common terminal 72 is provided with a through hole 720a. When the wire 350 is to be wound, a pin as a jig is inserted into the through hole 720a. The pin is used for guiding a turning portion of the wire 350 when the wire 350 is to be turned around from the first phase coil 35(U) to the second phase coil 35(V).

In this embodiment, as shown in FIGS. 6 and 7, a second divided insulator 320B located on one side "CW" in the circumferential direction with respect to the first divided insulator 320A is provided with a guide groove part 329 which guides the wires 350 extended from the first phase coil 35(U) and the second phase coil 35(V) to the first wire connection part 722a of the first divided insulator 320A. The groove part 329 is extended in the circumferential direction on one side "L1" of the outer peripheral side portion 321 in the motor axial line "L" direction. The groove part 329 is provided with a first wall part 329a located on an inner side in the radial direction, a second wall part 329b located on an outer side in the radial direction with respect to the first wall part 329a, and a bottom part 329c which connects the first wall part 329a with the second wall part 329b. The bottom part 329c is inclined to one side "L1" in the motor axial line "L" direction from one side "CW" in the circumferential direction toward the other side "CCW". When viewed in a direction perpendicular to the motor axial line "L", an end part 329d on the other side "CCW" in the circumferential direction of the bottom part 329c is overlapped with a part of the first wire connection part 722a. Therefore, the wires 350 extended from the first phase coil 35(U) and the second phase coil 35(V) are set at a height position substantially equal to the first wire connection part 722a when the wires 350 are led from the groove part 329 to the first wire connection part 722a and thus, the end parts 352 of the wires 350 extended from the first phase coil 35(U) and the second phase coil 35(V) are easily connected with the first wire connection part 722a.

As shown in FIGS. 6, 7 and 8, the leg parts 725 includes a first leg part 726 and a second leg part 727 which is located on the other side "CCW" in the circumferential direction with respect to the first leg part 726. Corresponding to this structure, the first divided insulator 320A is provided with a first hole 326 into which the first leg part 726 is fitted, and a second hole 327 into which the second leg part 727 is fitted on the other side "CCW" in the circumferential direction with respect to the first leg part 726. In this embodiment, the first hole 326 is a guide hole into which the first leg part 726 is fitted, and the second hole 327 is a press-fitted hole into which the second leg part 727 is fitted. Each of the two leg parts 725 is a bar shape whose cross section is quadrangular. On the other hand, in this embodiment, a cross section of the first hole 326 is a quadrangular shape, and a cross section of the second hole 327 is a circular shape.

(Detailed Structure of Conduction Terminal 73)

Figure 9:
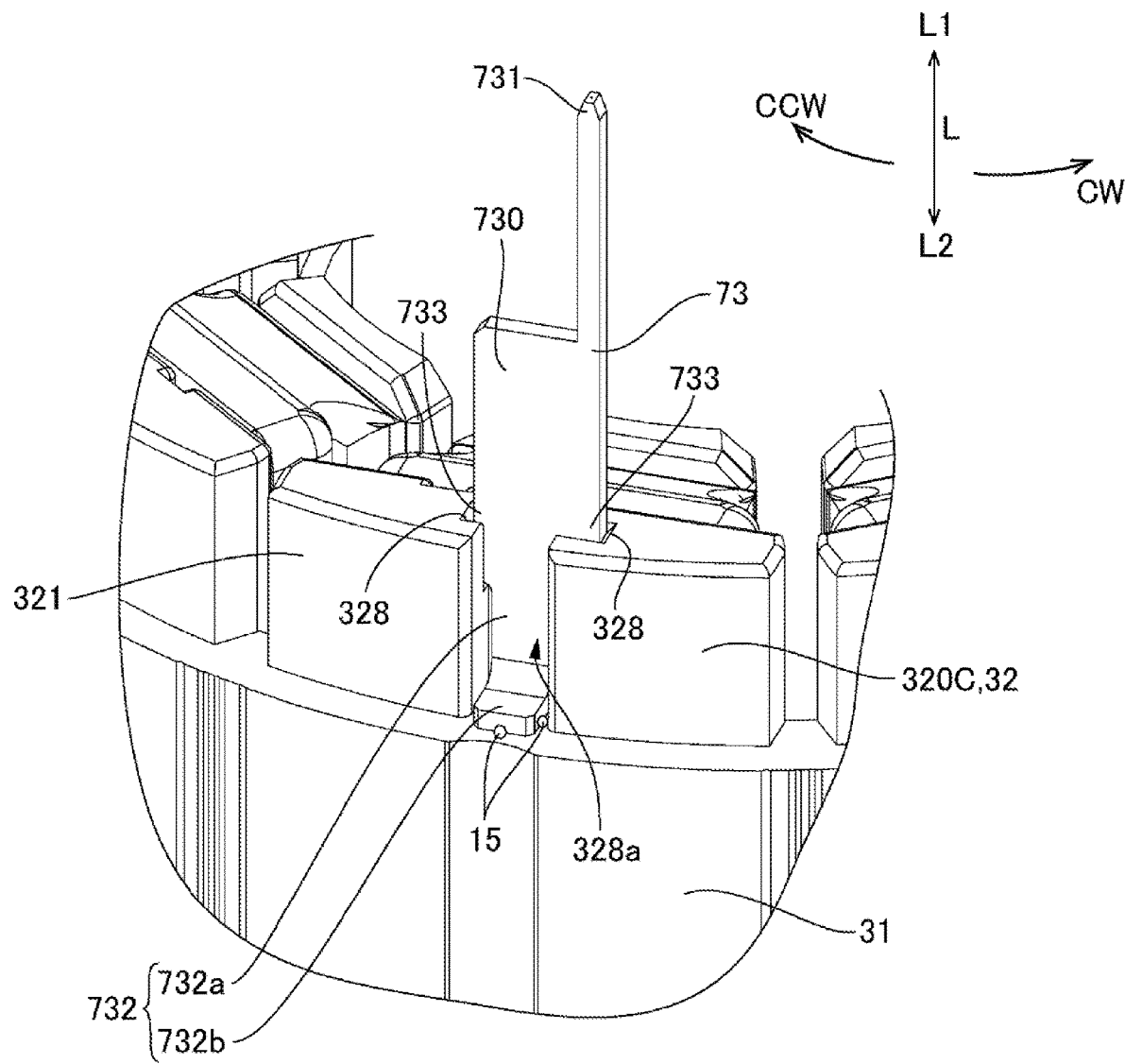
FIG. 9 is a perspective view showing a conduction terminal and its surroundings shown in FIG. 5 which are viewed from an outer side in the radial direction.
Figure 10:
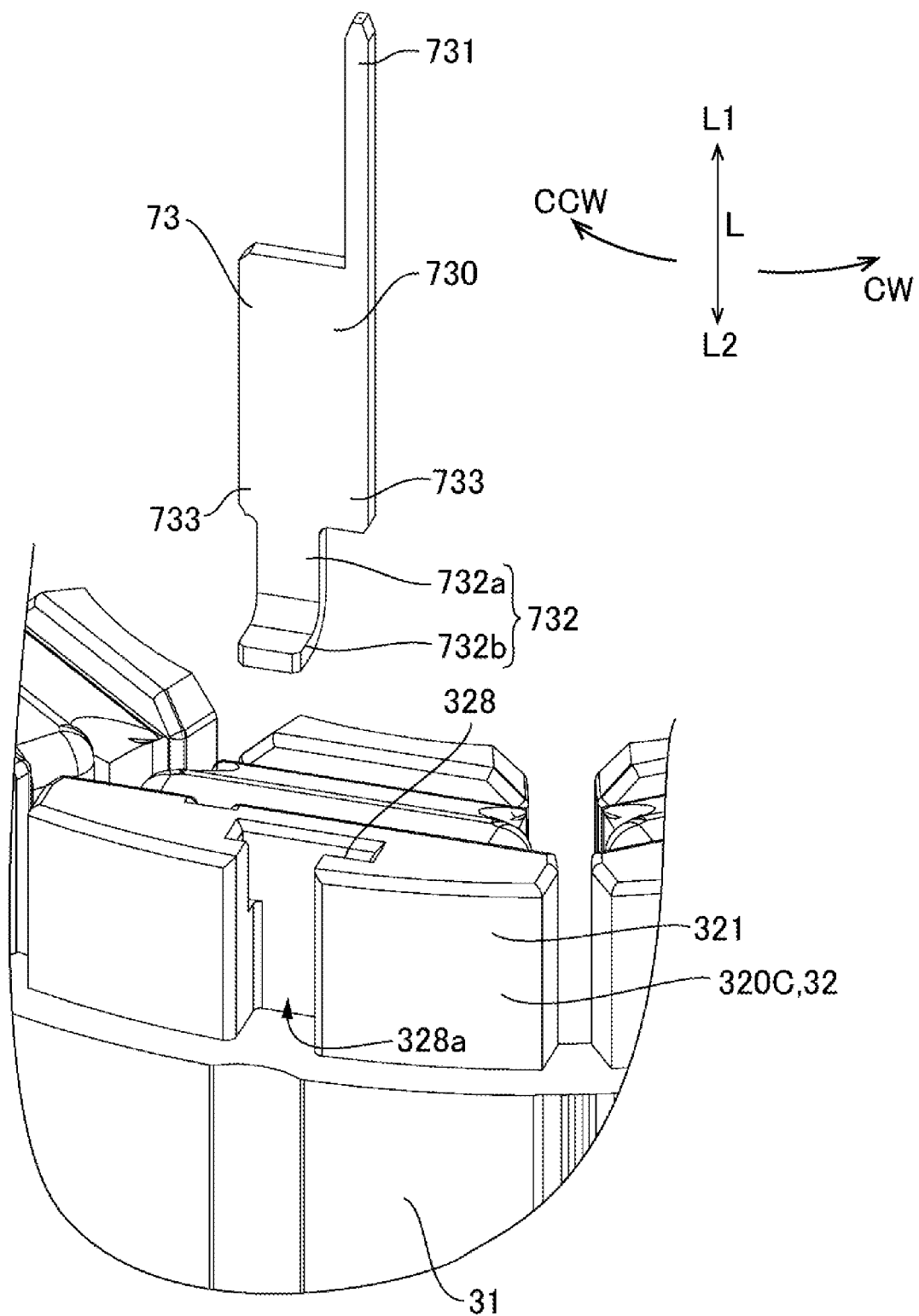
FIG. 10 is an exploded perspective view showing a state that a conduction terminal is separated from an insulator.

FIG. 9 is a perspective view showing the conduction terminal 73 and its surroundings shown in FIG. 5 which are viewed from an outer side in the radial direction. FIG. 10 is an exploded perspective view showing a state that the conduction terminal 73 is separated from the insulator 32.

The conduction terminal 73 electrically connects the board 19 with the stator core 31. As shown in FIGS. 9 and 10, the conduction terminal 73 is provided with a main body part 730 whose plate thickness direction is directed in the radial direction and which is extended in the circumferential direction, a board connection part 731 which is protruded from the main body part 730 to one side "L1" in the motor axial line "L" direction, a core connection part 732 which is protruded from the main body part 730 to the other side "L2" in the motor axial line "L" direction, and a held part 733 which is held by the divided insulator 320C. A plate thickness direction of the main body part 730 is directed in the radial direction, and the main body part 730 is formed in a plate shape which is extended in the motor axial line "L" direction.

The board connection part 731 is electrically connected with the third connection part 193 and is electrically connected with the ground of the board 19 through the third connection part 193. As shown in FIG. 4, the board connection part 731 is protruded and exposed from the bottom wall 63 of the resin sealing member 60 to one side "L1" in the motor axial line "L" direction.

The core connection part 732 is electrically connected with the stator core 31. A width in the circumferential direction of the core connection part 732 is narrower than a width in the circumferential direction of the main body part 730. The core connection part 732 is provided with an extended part 732a which is extended in the motor axial line "L" direction, and a bent part 732b which is bent and extended from an end part of the extended part 732a on the other side "L2" in the motor axial line "L" to an outer side in the radial direction.

In this embodiment, the held part 733 is both end portions in the circumferential direction of the main body part 730. Corresponding to this structure, the divided insulator 320C is provided with a holding groove 328 into which the held part 733 is fitted from one side "L1" in the motor axial line "L" direction. The holding groove 328 is extended from an end part of the divided insulator 320C toward the other side "L2" in the motor axial line "L" direction. An outer peripheral side portion 321 of the divided insulator 320C is provided with a cut-out part 328a which is cut out in the motor axial line "L" direction on an outer side in the radial direction of the holding groove 328. The cut-out part 328a is extended in the motor axial line "L" direction. When the main body part 730 is inserted into the holding groove 328 from one side "L1" in the motor axial line "L" direction, the held part 733 is held by the holding groove 328.

Figure 11:
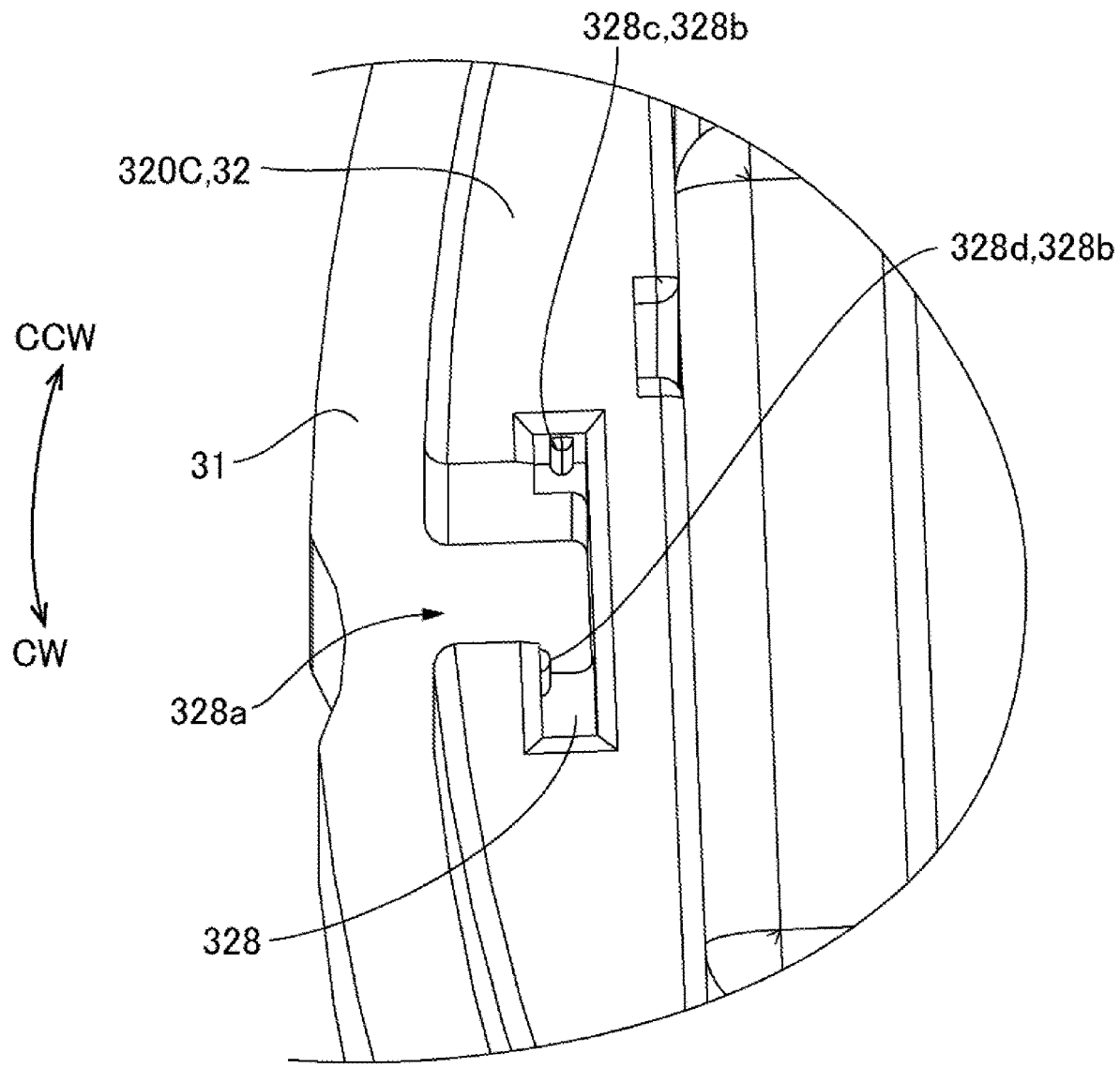
FIG. 11 is a perspective view showing the insulator in FIG. 10 which is viewed from one side in a motor axial line direction.

FIG. 11 is a perspective view showing the insulator 32 in FIG. 10 which is viewed from one side "L1" in the motor axial line direction. As shown in FIG. 11, the holding groove 328 is provided with a positioning rib 328b which is protruded from an inner peripheral face. In this embodiment, the positioning rib 328b includes a first rib 328c which is protruded from an inner peripheral face on the other side "CCW" in the circumferential direction to one side "CW" in the circumferential direction, and a second rib 328d which is protruded from an inner peripheral face on an outer side in the radial direction to an inner side in the radial direction. When the held part 733 is fitted to the holding groove 328, the first rib 328c and the second rib 328d are abutted with the held part 733 to position the held part 733. In this manner, the conduction terminal 73 is positioned by the divided insulator 320C and held in a press-fitted state. Further, as shown in FIG. 9, the core connection part 732 is accommodated in the cut-out part 328a. Further, the bent part 732b is abutted with the stator core 31 and fixed to the stator core 31 by welding. In this embodiment, the bent part 732b and the stator core 31 are welded to each other by a laser. Further, as shown in FIG. 9, when laser welding is performed, a plurality of welded marks 15 is formed over the bent part 732b and the stator core 31.

(Operations and Effects)

According to this embodiment, the core connection part 732 of the conduction terminal 73 is fixed to the stator core 31 by welding. Further, the board connection part 731 of the conduction terminal 73 is electrically connected with the third connection part 193 and is electrically connected with the ground of the board 19 through the third connection part 193. Therefore, the stator core 31 and the conduction terminal 73 are firmly fixed to each other by welding and thus, contact failure of the stator core 31 with the conduction terminal 73 due to vibration of the motor or the like can be restrained. As a result, the stator core 31 and the ground of the board 19 are surely set in a conductive state and thus, noise generated in the stator core 31 can be further surely restrained.

Further, the core connection part 732 is provided with the extended part 732a which is extended in the motor axial line "L" direction, and the bent part 732b which is bent and extended from an end part on the other side "L2" in the motor axial line "L" direction of the extended part 732a to an outer side in the radial direction. The bent part 732b is abutted with the stator core 31 and fixed to the stator core 31 by welding. Therefore, the bent part 732b is abutted with the stator core 31 and thus, the conduction terminal 73 can be fixed by welding in a state that the conduction terminal 73 is positioned in the motor axial line "L" direction.

Further, in this embodiment, the positioning rib 328b includes the first rib 328c which is protruded from an inner peripheral face on the other side "CCW" in the circumferential direction to one side "CW" in the circumferential direction, and the second rib 328d which is protruded from an inner peripheral face on an outer side in the radial direction to an inner side in the radial direction. Therefore, when the held part 733 is fitted to the holding groove 328, the first rib 328c and the second rib 328d are abutted with the held part 733 to position the held part 733 and thus, the conduction terminal 73 is positioned by the divided insulator 320C and held in a press-fitted state.

Further, in this embodiment, the bent part 732b is bent and extended from an end part of the extended part 732 on the other side "L2" in the motor axial line "L" to an outer side in the radial direction. The outer peripheral side portion 321 of the divided insulator 320C is provided with the cut-out part 328a which is cut out in the motor axial line "L" direction on an outer side in the radial direction of the holding groove 328. Therefore, the core connection part 732 is accommodated in the cut-out part 328a and thus, when the conduction terminal 73 has been attached to the divided insulator 320C, thickness in the radial direction of the divided insulator 320C and the conduction terminal 73 can be restrained from increasing. Further, the bent part 732b and the stator core 31 can be welded to each other from an outer side in the radial direction and thus, a welding operation is easily performed.

Second Embodiment

Figure 12:
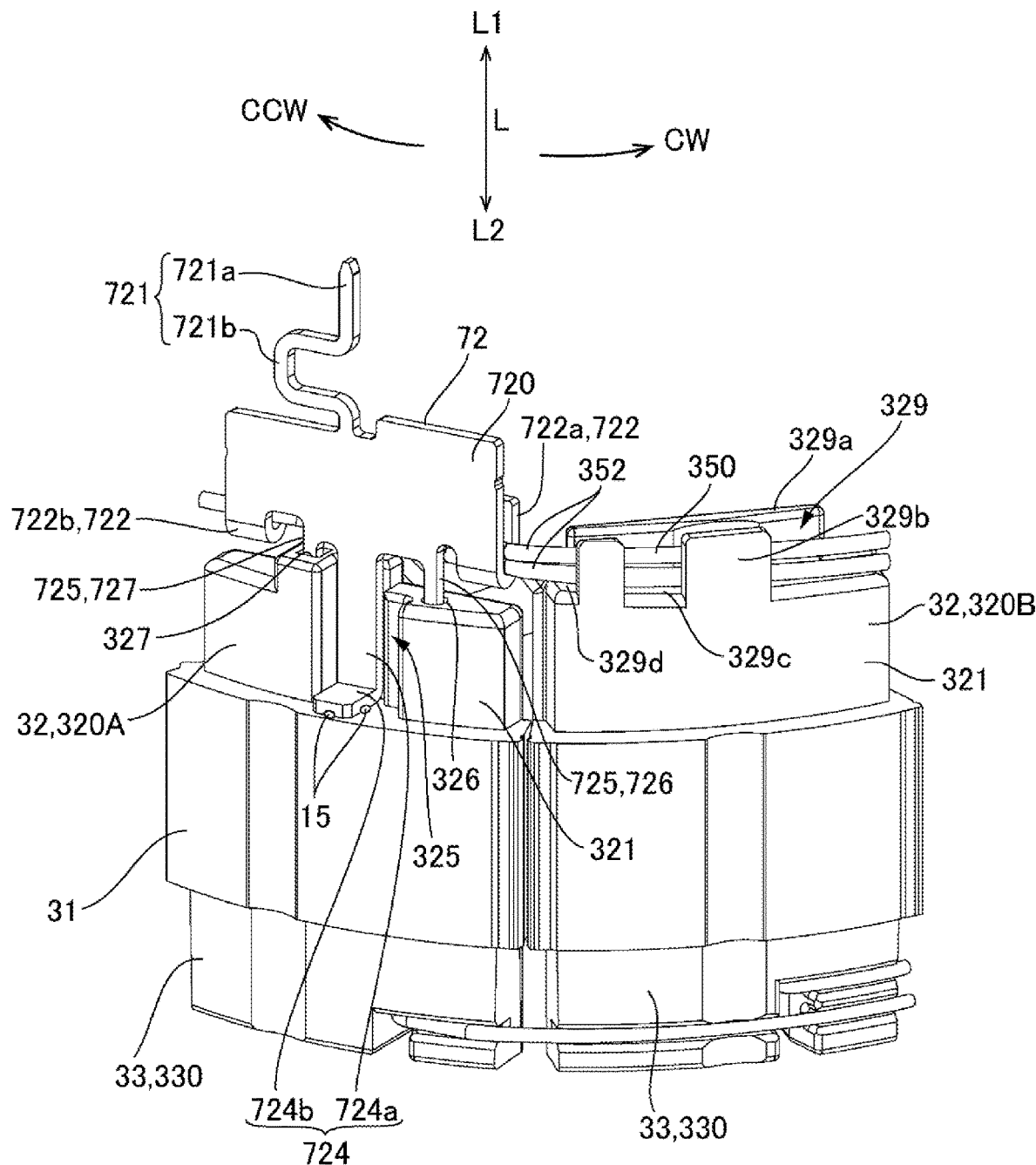
FIG. 12 is a perspective view showing a common terminal and its surroundings which are viewed from an outer side in a radial direction in a motor in accordance with a second embodiment of the present invention.
Figure 13:
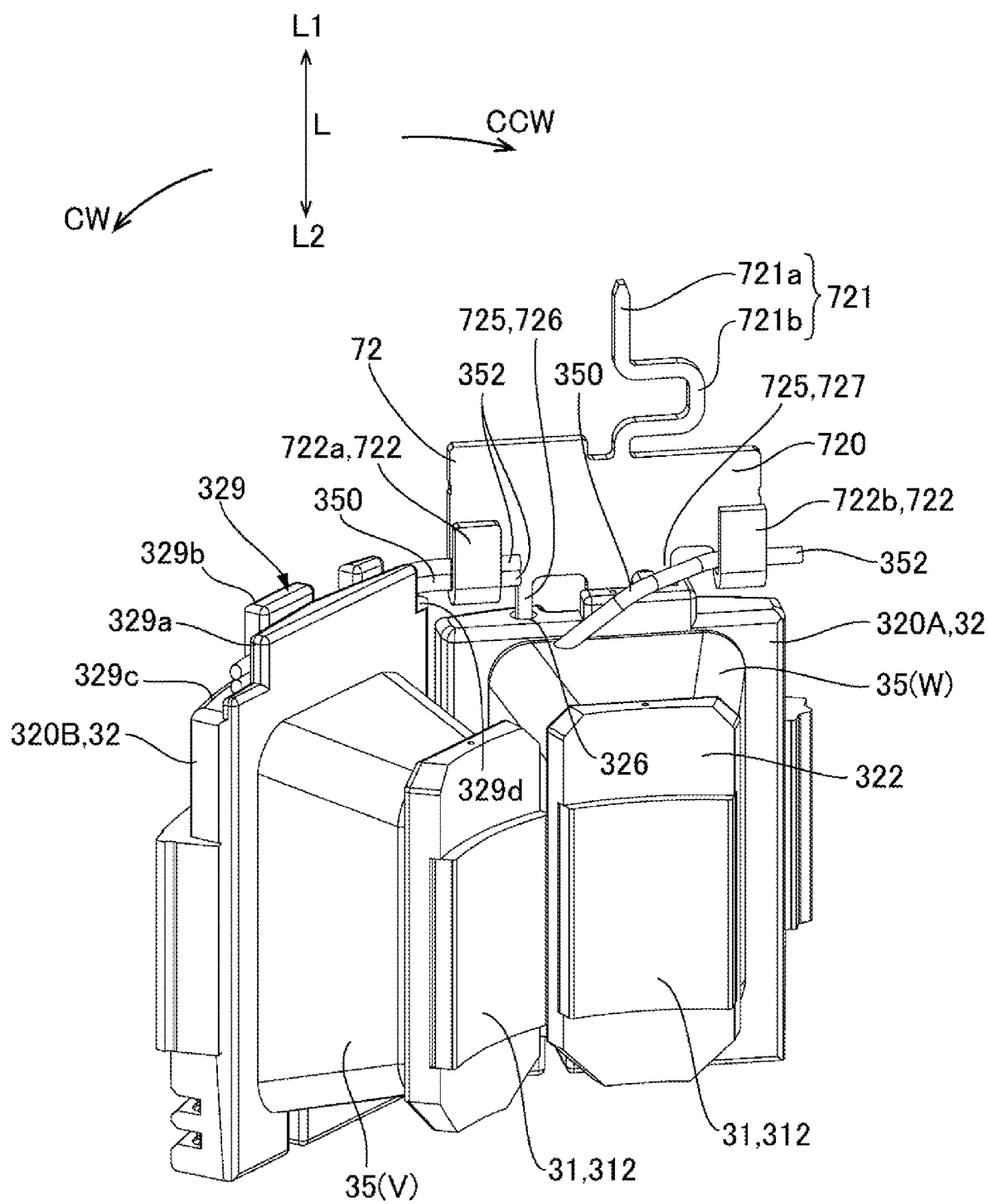
FIG. 13 is a perspective view showing the common terminal and its surroundings which are viewed from an inner side in the radial direction in the motor in accordance with the second embodiment of the present invention.
Figure 14:
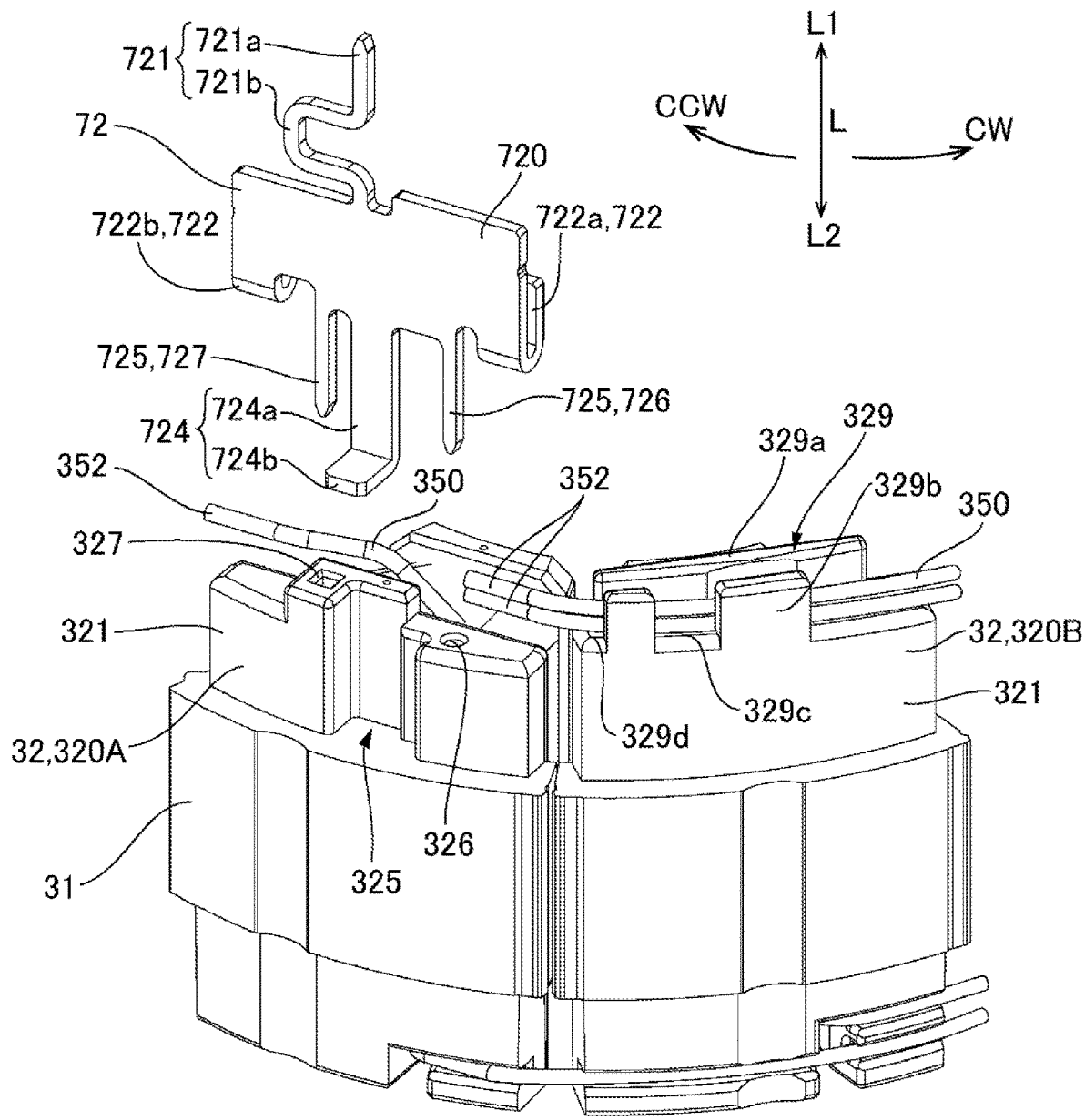
FIG. 14 is an exploded perspective view showing a state that a common terminal is detached from an insulator.

Next, a motor in accordance with a second embodiment of the present invention will be described below. The motor in the second embodiment differs from the motor in the first embodiment in a point that a common terminal is a conduction terminal. Therefore, in the second embodiment, the same reference signs are used in the same structures as the first embodiment and their explanations may be omitted. FIG. 12 is a perspective view showing a common terminal 72 and its surroundings which are viewed from an outer side in the radial direction in a motor in accordance with a second embodiment of the present invention. FIG. 13 is a perspective view showing the common terminal 72 and its surroundings which are viewed from an inner side in the radial direction in the motor in accordance with the second embodiment of the present invention. FIG. 14 is an exploded perspective view showing a state that the common terminal 72 is detached from an insulator 32.

The common terminal 72 in this embodiment is also a conduction terminal and electrically connects the board 19 with the stator core 31. As shown in FIGS. 12 and 13, the common terminal 72 in this embodiment is held by an outer peripheral side portion 321 of the first divided insulator 320A.

As shown in FIGS. 12, 13 and 14, the common terminal 72 is provided with a main body part 720 which is extended in the circumferential direction in a state that its plate thickness direction is directed in the radial direction, a board connection part 721 which is protruded from the main body part 720 to one side "L1" in the motor axial line "L" direction, two wire connection parts 722 in which two portions protruded from two positions in the circumferential direction of the main body part 720 are bent so as to hold end parts 352 of the wires 350 on their inner sides, leg part 725 which are protruded from the main body part 720 toward a first divided insulator 320A, and a core connection part 724 which is protruded from the main body part 720 to the other side "L2" in the motor axial line "L" direction.

The board connection part 721 is electrically connected with the second connection part 192 and is electrically connected to a ground of the board 19 through the second connection part 192. In this embodiment, the board connection part 721 is provided with a straight portion 721a which is electrically connected with the second connection part 192, and an elastic portion 721b which is elastically deformable between the straight portion 721a and the main body part 720. The straight portion 721a is extended in a straight line shape in the motor axial line "L" direction. The elastic portion 721b is curved to the other side "CCW" in the circumferential direction.

The main body part 720 is formed in a flat plate shape which is extended in a straight line manner along the circumferential direction. The leg parts 725 are held by the first divided insulator 320A. The leg parts 725 are provided between the wire connection parts 722. Further, each of the two wire connection parts 722 is bent so as to hold the end part 352 of the wire 350 on its inner side. The wire connection part 722 holds the end part 352 of the wire 350 by fusing processing and is electrically connected with the end part 352 of the wire 350.

The two wire connection parts 722 includes a first wire connection part 722a and a second wire connection part 722b which is provided on the other side "CCW" in the circumferential direction with respect to the first wire connection part 722a. An end part 352 of a wire 350 extended from a first phase coil 35(U) and an end part 352 of a wire 350 extended from a second phase coil reach the first wire connection part 722a from one side "CW" in the circumferential direction. An end part 352 of a wire 350 extended from a third phase coil 35(W) reaches the second wire connection part 722b from one side "CW" in the circumferential direction.

In this embodiment, as shown in FIGS. 12 and 13, a second divided insulator 320B located on one side "CW" in the circumferential direction with respect to the first divided insulator 320A is provided with a guide groove part 329 which guides the wires 350 extended from the first phase coil 35(U) and the second phase coil 35(V) to the first wire connection part 722a of the first divided insulator 320A. The groove part 329 is extended in the circumferential direction on one side "L1" of the outer peripheral side portion 321 in the motor axial line "L" direction. The groove part 329 is provided with a first wall part 329a located on an inner side in the radial direction, a second wall part 329b located on an outer side in the radial direction with respect to the first wall part 329a, and a bottom part 329c which connects the first wall part 329a with the second wall part 329b. The bottom part 329c is inclined to one side "L1" in the motor axial line "L" direction from one side "CW" in the circumferential direction toward the other side "CCW". When viewed in a direction perpendicular to the motor axial line "L", an end part 329d on the other side "CCW" in the circumferential direction of the bottom part 329c is overlapped with a part of the first wire connection part 722a.

In this embodiment, the leg parts 725 structure a held part. As shown in FIGS. 12, 13 and 14, the leg parts 725 include a first leg part 726 which is located on one side "CW" in the circumferential direction with respect to the core connection part 724, and a second leg part 727 which is located on the other side "CCW" in the circumferential direction with respect to the core connection part 724. Corresponding to this structure, the first divided insulator 320A is provided with a first hole 326 into which the first leg part 726 is fitted, and a second hole 327 into which the second leg part 727 is fitted on the other side "CCW" in the circumferential direction with respect to the first leg part 726. In this embodiment, the first hole 326 is a press-fitted hole into which the first leg part 726 is press-fitted, and the second hole 327 is a guide hole into which the second leg part 727 is fitted. Each of the two leg parts 725 is a bar shape whose cross section is quadrangular. On the other hand, in this embodiment, a cross section of the first hole 326 is a circular shape, and a cross section of the second hole 327 is a quadrangular shape.

Figure 15:
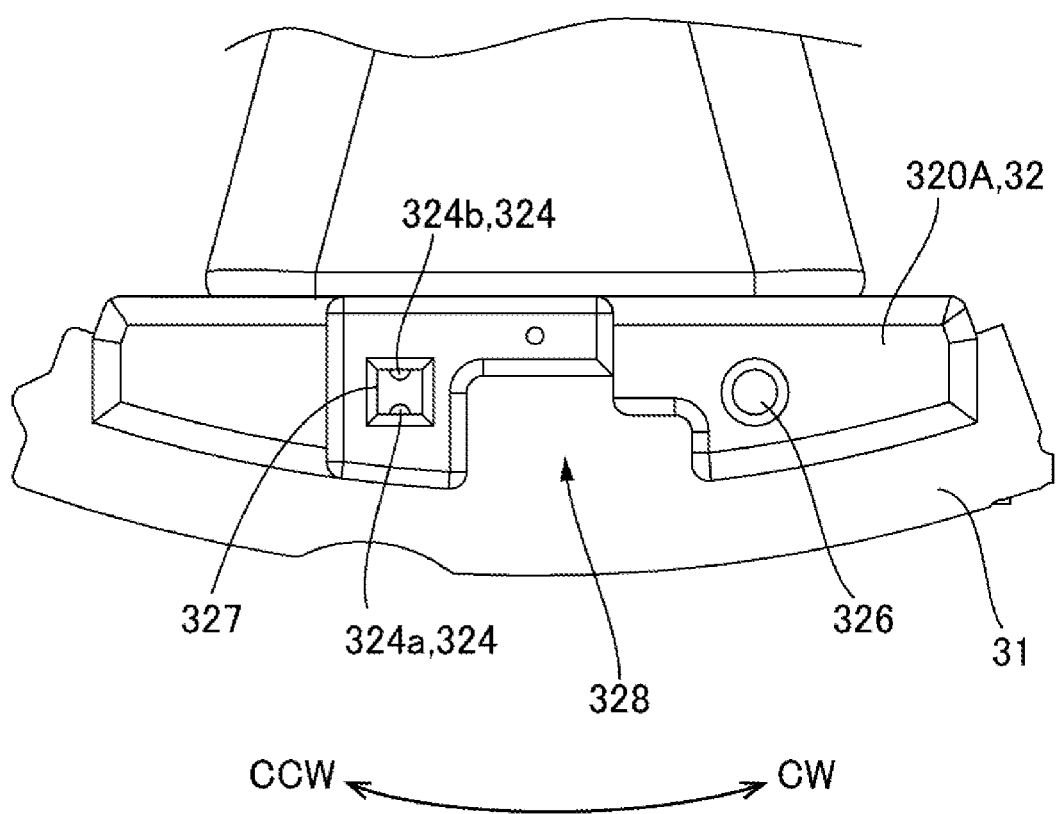
FIG. 15 is a view showing the insulator in FIG. 14 which is viewed from one side in a motor axial line direction.

FIG. 15 is a view showing the insulator 32 in FIG. 14 which is viewed from one side "L1" in the motor axial line "L" direction. As shown in FIG. 15, the second hole 327 is provided with a positioning rib 324 which is protruded in the radial direction from its inner peripheral face. In this embodiment, the positioning rib 324 includes a first rib 324a which is protruded from an inner peripheral face on an outer side in the radial direction toward an inner side in the radial direction, and a second rib 324b which is protruded from an inner peripheral face on an inner side in the radial directions to an outer side in the radial direction. When the second leg part 727 is fitted into the second hole 327, the first rib 324a and the second rib 324b are abutted with the second leg part 727 and positioning of the second leg part 727 is performed in the radial direction.

As shown in FIGS. 12 and 13, the core connection part 732 is electrically connected with the stator core 31. The core connection part 732 is located between the first leg part 726 and the second leg part 727. The core connection part 724 is provided with an extended part 724a which is extended in the motor axial line "L" direction, and a bent part 724b which is bent and extended from an end part of the extended part 724a on the other side "L2" in the motor axial line "L" to an outer side in the radial direction. Corresponding to this structure, the outer peripheral side portion 321 of the first divided insulator 320A is provided with a cut-out part 325 which is cut out to an inner side in the radial direction. The cut-out part 325 is extended in the motor axial line "L" direction. When the first leg part 726 and the second leg part 727 are respectively held by the first hole 326 and the second hole 327, the core connection part 724 is accommodated in the cut-out part 325. In a state that the common terminal 72 is held by the first divided insulator 320A, the bent part 724b is abutted with the stator core 31 and fixed to the stator core 31 by welding. In this embodiment, the bent part 724b and the stator core 31 are welded to each other by a laser. Further, as shown in FIG. 12, when laser welding is performed, a plurality of welded marks 15 is formed over the bent part 732b and the stator core 31.

(Operations and Effects)

According to this embodiment, similarly to the first embodiment, the stator core 31 and the common terminal 72 (conduction terminal) are firmly fixed to each other by welding and thus, contact failure of the stator core 31 with the common terminal 72 due to vibration of the motor or the like can be restrained. As a result, the stator core 31 and the ground of the board 19 are surely set in a conductive state and thus, noise generated in the stator core 31 can be surely restrained. Further, similarly to the first embodiment, the bent part 724b is abutted with the stator core 31 and thus, the common terminal 72 can be fixed by welding in a state that the common terminal 72 is positioned in the motor axial line "L" direction.

In this embodiment, the first hole 326 is a press-fitted hole into which the first leg part 726 is fitted, and the second hole 327 is a guide hole into which the second leg part 727 is fitted. Therefore, in the two leg parts 725, the second hole 327 into which the second leg part 727 is fitted is used for a guide and thus, in comparison with a case that both of the two leg parts are press-fitted, attachment of the common terminal 72 to the insulator 32 is easily performed.

In this embodiment, the second hole 327 is provided with the positioning rib 324 which is protruded in the radial direction from its inner peripheral face. The positioning rib 324 includes the first rib 324a which is protruded from an inner peripheral face on an outer side in the radial direction toward an inner side in the radial direction, and the second rib 324b which is protruded from an inner peripheral face on an inner side in the radial directions to an outer side in the radial direction. Therefore, when the second leg part 727 is fitted into the second hole 327, the first rib 324a and the second rib 324b are abutted with the second leg part 727 and positioning of the second leg part 727 is performed in the radial direction.

Further, in this embodiment, the bent part 724b is bent and extended from an end part of the extended part 724a on the other side "L2" in the motor axial line "L" to an outer side in the radial direction. The first divided insulator 320A is provided with the cut-out part 325 which is cut out in the motor axial line "L" direction between the first hole 326 and the second hole 327. Therefore, the core connection part 724 can be accommodated in the cut-out part 325 and thus, when the common terminal 72 has been attached to the first divided insulator 320A, thickness in the radial direction of the first divided insulator 320A and the common terminal 72 can be restrained from increasing. Further, the bent part 724b and the stator core 31 can be welded to each other from an outer side in the radial direction and thus, a welding operation is easily performed.

In this embodiment, the conduction terminal is provided with the wire connection parts 722 which are bent so as to hold the end parts 352 of a plurality of the wires 350 on their inner sides. In other words, the conduction terminal can be utilized as the common terminal 72.

In this embodiment, the insulator 32 is comprised of a plurality of the divided insulators 320 which are respectively provided so as to correspond to a plurality of the salient poles 312. The common terminal 72 is held by the first divided insulator 320A which is one of a plurality of the divided insulators 320. Therefore, the common terminal 72 is provided in the first divided insulator 320A which is one of a plurality of the divided insulators 320 and thus, relative positional accuracy of the hole into which the leg part 725 is fitted is high. Accordingly, it is easy to attach the common terminal 72 to the insulator 32.

In this embodiment, in a plurality of the divided insulators 320, the second divided insulator 320B which is located on one side "CW" in the circumferential direction with respect to the first divided insulator 320A is provided with the groove part 329 for guiding a part of a plurality of the wires 350. The bottom part 329c of the groove part 329 is inclined to one side "L1" in the motor axial line "L" direction toward the other side "CCW" in the circumferential direction. When viewed in a direction perpendicular to the motor axial line "L", the end part 329d on the other side "CCW" in the circumferential direction of the bottom part 329c is overlapped with a part of the first wire connection part 722a. Therefore, the wires 350 extended from the first phase coil 35(U) and the second phase coil 35(V) become height positions substantially equal to the first wire connection part 722a when the wires 350 are led from the groove part 329 to the first wire connection part 722a and thus, the end parts 352 of the wires 350 extended from the first phase coil 35(U) and the second phase coil 35(V) are easily connected with the first wire connection part 722a.

Other Embodiments

Figure 16:
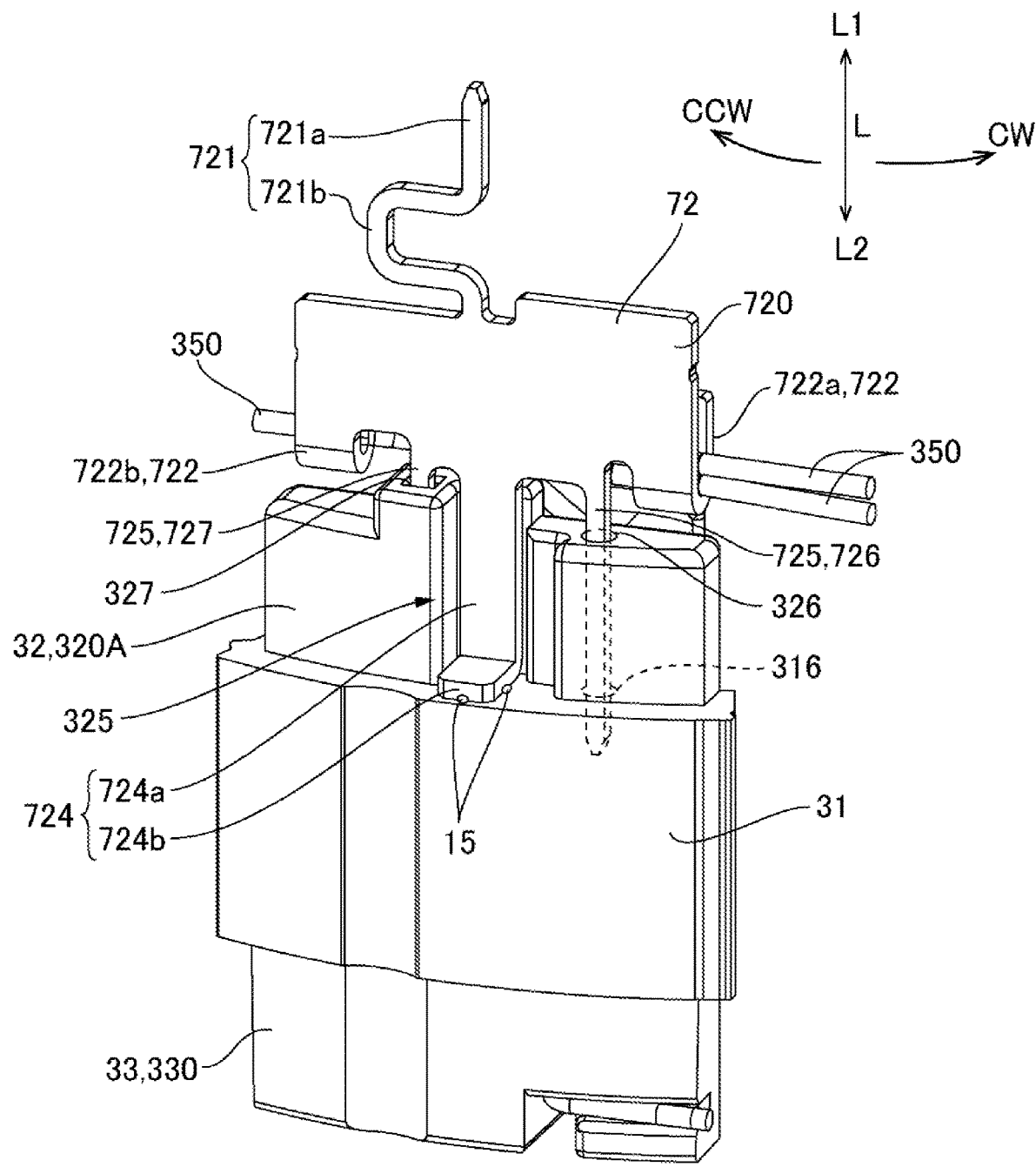
FIG. 16 is a perspective view showing a common terminal and its surroundings which are viewed from an outer side in a radial direction in a motor in accordance with another embodiment of the present invention.

FIG. 16 is a perspective view showing a common terminal 72 and its surroundings which are viewed from an outer side in the radial direction in a motor in accordance with another embodiment of the present invention. As shown in FIG. 16, in this another embodiment, a first hole 326 which is a press-fitted hole penetrates through a first divided insulator 320A in the motor axial line "L" direction, and a stator core 31 is provided with a third hole 316 overlapped with the first hole 326 in the motor axial line "L" direction. In this case, the first leg part 726 is press-fitted to the third hole 316. Therefore, the first leg part 726 of the common terminal 72 is press-fitted to the third hole 316 and thus, the common terminal 72 is hard to be come out from the insulator 32.

Embodiments of the present invention may be structured as follows.

(1) A motor including:
  a stator core in which a plurality of salient poles is disposed in a circumferential direction with a motor axial line as a center;
  an insulator which is held by the stator core;
  coils of a plurality of phases which are wound around the salient poles through the insulator;
  a board which is electrically connected with a plurality of wires for a number of the phases that are extended from the coils of the plurality of the phases and is disposed on one side in an axial line direction along the motor axial line with respect to the stator core; and a conduction terminal which electrically connects the board with the stator core;
where the conduction terminal is provided with:
a main body part whose plate thickness direction is directed in a radial direction;
a board connection part which is extended from the main body part to one side in the axial line direction and is electrically connected with the board;
a core connection part which is extended from the main body part to the other side in the axial line direction and is electrically connected with the stator core; and
a held part which is held by the insulator, and
the core connection part is fixed to the stator core by welding.

(2) The motor described in the above-mentioned structure (1), where
the core connection part is provided with an extended part which is extended in the axial line direction, and a bent part which is bent and extended in the radial direction from an end part on the other side of the extended part, and
the bent part is abutted with the stator core and is fixed to the stator core by welding.

(3) The motor described in the above-mentioned structure (2), where
the main body part is formed in a plate shape which is extended in the axial line direction,
the held part is both end portions in the circumferential direction of the main body part, and
the insulator is provided with a holding groove to which the held part is fitted in the axial line direction.

(4) The motor described in the above-mentioned structure (3), where the holding groove is provided with a positioning rib which is protruded from an inner peripheral face of the holding groove.

(5) The motor described in the above-mentioned structure (3) or (4), where
the bent part is bent and extended to an outer side in the radial direction from an end part on the other side of the extended part, and
the insulator is provided with a cut-out part which is cut out in the axial line direction on an outer side in the radial direction of the holding groove.

(6) The motor described in the above-mentioned structure (2), where
the held part is provided with a first leg part which is located on one side in the circumferential direction with respect to the core connection part and is protruded from the main body part to the other side in the axial line direction, and a second leg part which is located on the other side in the circumferential direction with respect to the core connection part and is protruded from the main body part to the other side in the axial line direction, and
the insulator is provided with a first hole into which the first leg part is fitted and a second hole into which the second leg part is fitted.

(7) The motor described in the above-mentioned structure (6), where one of the first hole and the second hole is a press-fitted hole, and the other of the first hole and the second hole is a guide hole.

(8) The motor described in the above-mentioned structure (7), where each of the first leg part and the second leg part is formed in a bar shape with a quadrangular cross section, the press-fitted hole is formed in a shape with a circular cross section, and the guide hole is formed in a shape with a quadrangular cross section.

(9) The motor described in the above-mentioned structure (8), where the guide hole is provided with a positioning rib which is protruded in the radial direction from an inner peripheral face.

(10) The motor described in one of the above-mentioned structures (6) through (8), where
the bent part is bent and extended to an outer side in the radial direction from an end part on the other side of the extended part, and
the insulator is provided with a cut-out part which is cut out in the axial line direction between the first hole and the second hole.

(11) The motor described in one of the above-mentioned structures (6) through (10), where the conduction terminal is provided with a wire connection part which is bent so as to hold end parts of a plurality of the wires on an inner side.

(12) The motor described in one of the above-mentioned structures (6) through (11), where
the wire connection part includes a first wire connection part to which an end part of a part of the plurality of the wires is reached from one side in the circumferential direction, and a second wire connection part to which an end part of a remaining part of the plurality of the wires is reached from the other side in the circumferential direction,
the first wire connection part is located on one side in the circumferential direction with respect to the first leg part, and
the second wire connection part is located on the other side in the circumferential direction with respect to the second leg part.

(13) The motor described in the above-mentioned structure (12), where
the insulator includes a plurality of divided insulators each of which is provided so as to correspond to each of a plurality of the salient poles, and
the conduction terminal is held by a first divided insulator which is one of the plurality of the divided insulators.

(14) The motor described in the above-mentioned structure (13), where
a second divided insulator of the plurality of the divided insulators which is located on one side in the circumferential direction with respect to the first divided insulator is provided with a groove part for guiding the part of the plurality of the wires,
the groove part is provided with a first wall part located on an inner side in the radial direction, a second wall part located on an outer side in the radial direction with respect to the first wall part, and a bottom part which connects the first wall part with the second wall part,
the bottom part is inclined to one side in the axial line direction toward the other side in the circumferential direction, and
when viewed in a direction perpendicular to the axial line direction, an end part on the other side in the circumferential direction of the bottom part is overlapped with a part of the first wire connection part.

(15) The motor described in the above-mentioned structure (7) or (8), where
the press-fitted hole is penetrated through in the axial line direction,
the stator core is provided with a third hole which is overlapped with the press-fitted hole in the axial line direction, and
one of the first leg part and the second leg part which is fitted to the press-fitted hole is press-fitted to the third hole.

(16) A pump device including the motor described in one of the above-mentioned structures (1) through (16) and an impeller which is rotationally driven by the motor.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a stator core in which a plurality of salient poles is disposed in a circumferential direction with a motor axial line as a center;
   an insulator which is held by the stator core;
   coils of a plurality of phases which are wound around the salient poles through the insulator;
   a board which is electrically connected with a plurality of wires for a number of the phases that are extended from the coils of the plurality of the phases and is disposed on one side in an axial line direction along the motor axial line with respect to the stator core; and
   a conduction terminal which electrically connects the board with the stator core;
   wherein the conduction terminal comprises:
      a main body part whose plate thickness direction is directed in a radial direction;
      a board connection part which is extended from the main body part to one side in the axial line direction and is electrically connected with the board;
      a core connection part which is extended from the main body part to an other side in the axial line direction and is electrically connected with the stator core; and
      a held part which is held by the insulator, and
   the core connection part is fixed to the stator core by welding.

2. The motor according to claim 1, wherein
   the core connection part comprises an extended part which is extended in the axial line direction, and a bent part which is bent and extended in the radial direction from an end part on the other side of the extended part, and
   the bent part is abutted with the stator core and is fixed to the stator core by welding.

3. The motor according to claim 2, wherein
   the main body part is formed in a plate shape which is extended in the axial line direction,
   the held part is both end portions in the circumferential direction of the main body part, and
   the insulator comprises a holding groove to which the held part is fitted in the axial line direction.

4. The motor according to claim 3, wherein the holding groove comprises a positioning rib which is protruded from an inner peripheral face of the holding groove.

5. The motor according to claim 3, wherein
   the bent part is bent and extended to an outer side in the radial direction from an end part on the other side of the extended part, and
   the insulator comprises a cut-out part which is cut out in the axial line direction on an outer side in the radial direction of the holding groove.

6. The motor according to claim 2, wherein
   the held part comprises:
      a first leg part which is located on one side in the circumferential direction with respect to the core connection part and is protruded from the main body part to the other side in the axial line direction; and
      a second leg part which is located on an other side in the circumferential direction with respect to the core connection part and is protruded from the main body part to the other side in the axial line direction, and
   the insulator comprises a first hole into which the first leg part is fitted and a second hole into which the second leg part is fitted.

7. The motor according to claim 6, wherein one of the first hole and the second hole is a press-fitted hole, and an other of the first hole and the second hole is a guide hole.

8. The motor according to claim 7, wherein
   each of the first leg part and the second leg part is formed in a bar shape with a quadrangular cross section,
   the press-fitted hole is formed in a shape with a circular cross section, and
   the guide hole is formed in a shape with a quadrangular cross section.

9. The motor according to claim 8, wherein the guide hole comprises a positioning rib which is protruded from an inner peripheral face of the guide hole in the radial direction.

10. The motor according to claim 6, wherein
    the bent part is bent and extended to an outer side in the radial direction from an end part on the other side of the extended part, and
    the insulator comprises a cut-out part which is cut out in the axial line direction between the first hole and the second hole.

11. The motor according to claim 6, wherein the conduction terminal comprises a wire connection part which is bent so as to hold end parts of a plurality of the wires on an inner side.

12. The motor according to claim 11, wherein
    the wire connection part comprises:
       a first wire connection part to which an end part of a part of the plurality of the wires is reached from one side in the circumferential direction; and
       a second wire connection part to which an end part of a remaining part of the plurality of the wires is reached from the other side in the circumferential direction,
    the first wire connection part is located on one side in the circumferential direction with respect to the first leg part, and
    the second wire connection part is located on the other side in the circumferential direction with respect to the second leg part.

13. The motor according to claim 12, wherein
    the insulator comprises a plurality of divided insulators each of which is provided so as to correspond to each of a plurality of the salient poles, and
    the conduction terminal is held by a first divided insulator which is one of the plurality of the divided insulators.

14. The motor according to claim 13, wherein
    a second divided insulator of the plurality of the divided insulators which is located on one side in the circumferential direction with respect to the first divided insulator comprises a groove part for guiding the part of the plurality of the wires,
    the groove part comprises a first wall part located on an inner side in the radial direction, a second wall part located on an outer side in the radial direction with respect to the first wall part, and a bottom part which connects the first wall part with the second wall part, the bottom part is inclined to one side in the axial line direction toward the other side in the circumferential direction, and when viewed in a direction perpendicular to the axial line direction, an end part on the other side in the circumferential direction of the bottom part is overlapped with a part of the first wire connection part.

15. The motor according to claim 7, wherein the press-fitted hole is penetrated through in the axial line direction, the stator core comprises a third hole which is overlapped with the press-fitted hole in the axial line direction, and one of the first leg part and the second leg part which is fitted to the press-fitted hole is press-fitted to the third hole.

16. A pump device comprising:

the motor defined in claim 1; and an impeller which is rotationally driven by the motor.

\* \* \* \* \*